(12) United States Patent
Murayama et al.

(10) Patent No.: US 11,827,560 B2
(45) Date of Patent: *Nov. 28, 2023

(54) GLASS FOR CHEMICAL STRENGTHENING

(71) Applicant: AGC Inc., Tokyo (JP)

(72) Inventors: Suguru Murayama, Tokyo (JP); Kazuki Kanehara, Tokyo (JP); Eriko Maeda, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,547

(22) Filed: Dec. 20, 2022

(65) Prior Publication Data

US 2023/0119617 A1 Apr. 20, 2023

Related U.S. Application Data

(63) Continuation of application No. 16/911,878, filed on Jun. 25, 2020, now Pat. No. 11,572,305, which is a continuation of application No. PCT/JP2018/037115, filed on Oct. 3, 2018.

(30) Foreign Application Priority Data

Feb. 5, 2018 (JP) ................................ 2018-018508

(51) Int. Cl.
| | |
|---|---|
| *C03C 3/095* | (2006.01) |
| *C03C 3/085* | (2006.01) |
| *C03C 21/00* | (2006.01) |
| *C03C 3/078* | (2006.01) |
| *C03C 3/087* | (2006.01) |
| *C03C 3/093* | (2006.01) |
| *C03C 3/097* | (2006.01) |

(52) U.S. Cl.
CPC ............ *C03C 21/002* (2013.01); *C03C 3/078* (2013.01); *C03C 3/087* (2013.01); *C03C 3/093* (2013.01); *C03C 3/095* (2013.01); *C03C 3/097* (2013.01); *C03C 2201/3411* (2013.01)

(58) Field of Classification Search
CPC ......... C03C 3/085; C03C 3/087; C03C 3/095; C03C 3/091; C03C 3/093
See application file for complete search history.

(56) References Cited

U.S. PATENT DOCUMENTS

| | | | |
|---|---|---|---|
| 6,387,510 | B1 | 5/2002 | Nakashima et al. |
| 10,348,974 | B2 | 8/2019 | Murayama et al. |
| 10,370,287 | B2 | 8/2019 | Murayama et al. |
| 10,472,272 | B2 | 11/2019 | Murayama et al. |
| 11,572,305 | B2 * | 2/2023 | Murayama .............. C03C 3/087 |
| 2005/0244656 | A1 | 11/2005 | Ikenishi et al. |
| 2011/0312483 | A1 | 12/2011 | Nakashima et al. |
| 2012/0264585 | A1 | 10/2012 | Ohara et al. |
| 2012/0321898 | A1 | 12/2012 | Meinhardt et al. |
| 2013/0164509 | A1 | 6/2013 | Siebers et al. |
| 2013/0189486 | A1 | 7/2013 | Wang et al. |
| 2014/0235425 | A1 | 8/2014 | Nishizawa |
| 2014/0364298 | A1 | 12/2014 | Ohara et al. |
| 2015/0259244 | A1 | 9/2015 | Amin et al. |
| 2016/0347655 | A1 | 12/2016 | Meinhardt et al. |
| 2018/0186685 | A1 | 7/2018 | Murayama et al. |
| 2018/0265397 | A1 | 9/2018 | Murayama et al. |
| 2018/0319706 | A1 | 11/2018 | Murayama et al. |
| 2018/0327304 | A1 | 11/2018 | Murayama et al. |
| 2019/0194057 | A1 | 6/2019 | Murayama et al. |
| 2019/0263713 | A1 | 8/2019 | Murayama et al. |
| 2019/0276355 | A1 | 9/2019 | Meinhardt et al. |
| 2019/0292099 | A1 | 9/2019 | Murayama et al. |
| 2021/0053867 | A1 | 2/2021 | Murayama et al. |

FOREIGN PATENT DOCUMENTS

| | | |
|---|---|---|
| CN | 103003210 A | 3/2013 |
| JP | 2000-357318 A | 12/2000 |
| JP | 2001-172043 | 6/2001 |
| JP | 2005-314159 A | 11/2005 |
| JP | 2008-247732 | 10/2008 |
| JP | 2012-020921 A | 2/2012 |
| JP | 2012-232882 A | 11/2012 |
| JP | 2013-520385 A | 6/2013 |
| JP | 2013-520388 A | 6/2013 |
| WO | WO 2013/047679 | 4/2013 |
| WO | WO 2017/126605 A1 | 7/2017 |

OTHER PUBLICATIONS

International Search Report dated Dec. 25, 2018 in PCT/JP2018/037115 filed on Oct. 3, 2018, 5 pages.

* cited by examiner

*Primary Examiner* — Karl E Group
(74) *Attorney, Agent, or Firm* — Oblon, McClelland, Maier & Neustadt, L.L.P.

(57) ABSTRACT

The present invention relates to a glass for chemical strengthening including, in mole percentage on an oxide basis: 60 to 72% of $SiO_2$; 9 to 20% of $Al_2O_3$; 1 to 15% of $Li_2O$; 0.1 to 5% of $Y_2O_3$; 0 to 1.5% of $ZrO_2$; and 0 to 1% of $TiO_2$, having a total content of one or more kinds of MgO, CaO, SrO, BaO and ZnO of 1 to 10%, having a total content of $Na_2O$ and $K_2O$ of 1.5 to 10%, having a total content of $B_2O_3$ and $P_2O_5$ of 0 to 10%, wherein a ratio $([Al_2O_3]+[Li_2O])/([Na_2O]+[K_2O]+[MgO]+[CaO]+[SrO]+[BaO]+[ZnO]+[ZrO_2]+[Y_2O_3])$ is from 0.7 to 3, wherein a ratio $[MgO]/([CaO]+[SrO]+[BaO]+[ZnO])$ is from 10 to 45, and having a value M expressed by the following expression of 1,100 or more:

$$M=-5\times[SiO_2]+121\times[Al_2O_3]+50\times[Li_2O]-35\times[Na_2O]+32\times[K_2O]+85\times[MgO]+54\times[CaO]-41\times[SrO]-4\times[P_2O_5]+218\times[Y_2O_3]+436\times[ZrO_2]-1180,$$

wherein each of $[SiO_2]$, $[Al_2O_3]$, $[Li_2O]$, $[Na_2O]$, $[K_2O]$, $[MgO]$, $[CaO]$, $[SrO]$, $[P_2O_5]$, $[Y_2O_3]$, and $[ZrO_2]$ designates a content of each component in mole percentage on an oxide basis.

8 Claims, 5 Drawing Sheets

GLASS FOR CHEMICAL STRENGTHENING

CROSS REFERENCE TO RELATED APPLICATIONS

This application is a Continuation application of prior U.S. application Ser. No. 16/911,878, filed Jun. 25, 2020, the disclosure of which is incorporated herein by reference in its entirety. U.S. application Ser. No. 16/911,878 is a Continuation of PCT/JP2018/037115, filed Oct. 3, 2018, the disclosure of which is incorporated herein by reference in its entirety. U.S. application Ser. No. 16/911,878 claims priority to Japanese Application No. 2018-018508, filed Feb. 5, 2018, the disclosure of which is incorporated herein by reference in its entirety.

TECHNICAL FIELD

The present invention relates to a glass for chemical strengthening.

BACKGROUND ART

In recent years, a cover glass made of a chemically strengthened glass is used in order to protect a display device of a mobile apparatus such as a cellular phone, a smartphone, a personal digital assistant (PDA), or a tablet terminal and to enhance the appearance thereof.

The chemically strengthened glass has a tendency that the strength thereof become higher as a surface compressive stress (value) (CS) or a depth of compressive stress layer (DOL) thereof increases. On the other hand, an internal tensile stress (CT) occurs inside the glass so as to keep balance with the surface compressive stress. Therefore, the CT becomes larger as the CS or DOL increases. When a glass having a large CT is broken, the cracking manner is vigorous with a large number of broken pieces, thereby increasing a risk that the broken pieces may scatter.

Patent Literature 1 describes that a stress profile expressed by a bent line is formed by two stages of chemical strengthening treatment so that a surface compressive stress can be increased while suppressing an internal tensile stress. According to a specific method proposed therein, a $KNO_3$/$NaNO_3$ mixed salt comparatively low in K concentration is used in the first stage of the chemical strengthening treatment, and a $KNO_3$/$NaNO_3$ mixed salt comparatively high in K concentration is used in the second stage of the chemical strengthening treatment.

In addition, Patent Literature 2 discloses a lithium aluminosilicate glass capable of obtaining a comparatively large surface compressive stress and a comparatively large depth of compressive stress layer by two stages of chemical strengthening treatment. In the lithium aluminosilicate glass, both the CS and the DOL can be increased by two stages of chemical strengthening treatment in which a sodium salt is used in the first stage of the chemical strengthening treatment, and a potassium salt is used in the second stage of the chemical strengthening treatment.

CITATION LIST

Patent Literature

Patent Literature 1: US 2015/0259244
Patent Literature 2: JP-T-2013-520388

SUMMARY OF INVENTION

Technical Problem

Recently, demand for thinner and lighter cover glasses and cover glasses processed into curved shapes is increasing. Attention is paid to a lithium aluminosilicate glass capable of simultaneously increasing a surface compressive stress value (CS) and a depth of compressive stress layer (DOL).

However, the lithium aluminosilicate glass tends to be devitrified in a step of manufacturing the glass or in a step of bending or the like the obtained glass.

An object of the present invention is to provide a glass for chemical strengthening which is hardly devitrified but can achieve a large CS and a large DOL.

Solution to Problem

The present invention provides a glass for chemical strengthening including, in mole percentage on an oxide basis:
45 to 75% of $SiO_2$;
1 to 30% of $Al_2O_3$;
1 to 20% of $Li_2O$;
0 to 5% of $Y_2O_3$;
0 to 5% of $ZrO_2$; and
0 to 1% of $TiO_2$,
having a total content of one or more kinds of MgO, CaO, SrO, BaO and ZnO of 1 to 20%,
having a total content of $Na_2O$ and $K_2O$ of 0 to 10%,
having a total content of $B_2O_3$ and $P_2O_5$ of 0 to 10%, and
having a value M expressed by the following expression of 1,000 or more:

$$M=-5\times[SiO_2]+121\times[Al_2O_3]+50\times[Li_2O]-35\times[Na_2O]+32\times[K_2O]+85\times[MgO]+54\times[CaO]-41\times[SrO]-4\times[P_2O_5]+218\times[Y_2O_3]+43\ 6\times[ZrO_2]-1180.$$

In addition, the present invention provides a glass for chemical strengthening in which when the glass is chemically strengthened by an immersion in a sodium nitrate at 450° C. for 1 hour, a surface compressive stress value thereof is 300 MPa or more, and when the glass is chemically strengthened by an immersion in a sodium nitrate at 450° C. for 3 hour and a subsequent immersion in a potassium nitrate at 450° C. for 1.5 hours, a surface compressive stress value thereof is 800 MPa or more, and a chemically strengthened glass has a base composition including, in mole percentage on an oxide basis:
45 to 75% of $SiO_2$;
1 to 30% of $Al_2O_3$;
1 to 20% of $Li_2O$;
0 to 5% of $Y_2O_3$;
0 to 5% of $ZrO_2$; and
0 to 1% of $TiO_2$,
having a total content of one or more kinds of MgO, CaO, SrO, BaO and ZnO of 1 to 20%,
having a total content of $Na_2O$ and $K_2O$ of 0 to 10%,
having a total content of $B_2O_3$ and $P_2O_5$ of 0 to 10%, and
having a value M expressed by the above-described expression of 1,000 or more.

Advantageous Effects of Invention

According to the present invention, it is possible to provide a chemically strengthened glass which is hardly devitrified but has a large surface compressive stress value (CS) and a large depth of compressive stress layer (DOL).

DESCRIPTION OF EMBODIMENTS

Figure 1:
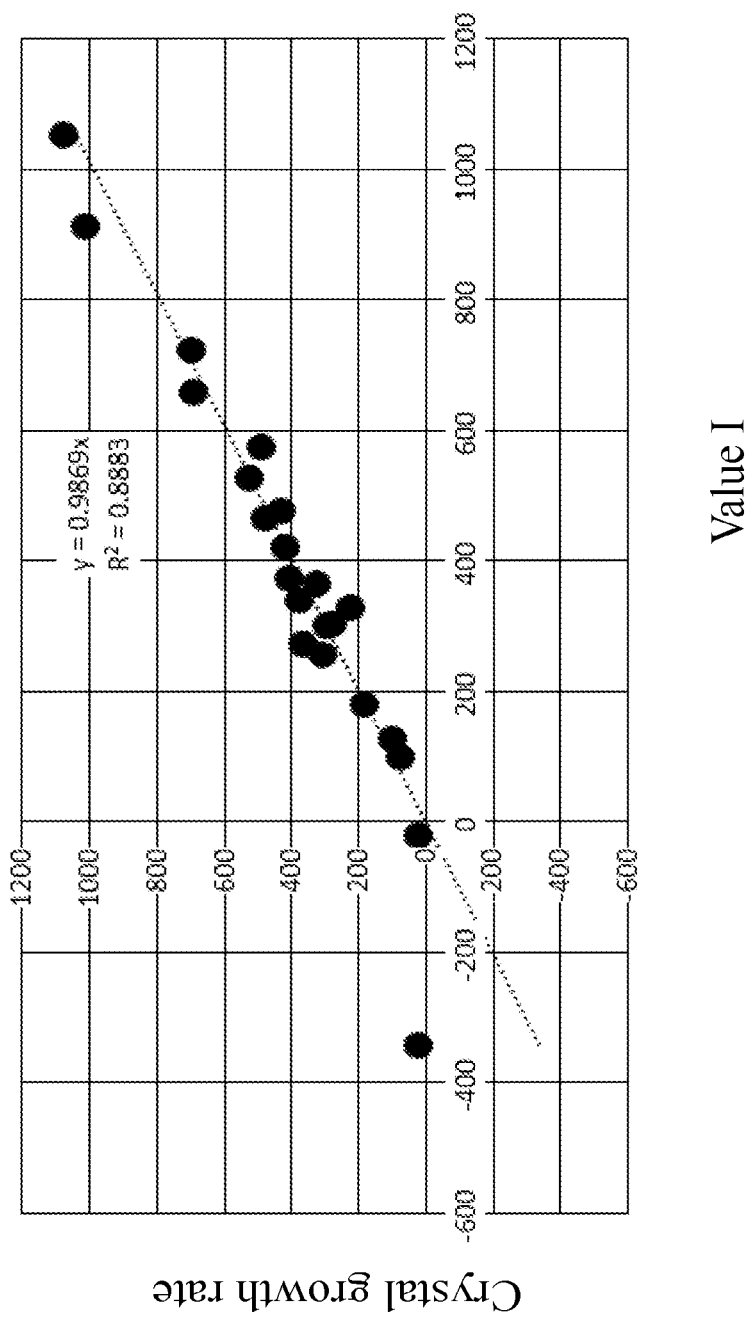
FIG. 1 is a graph showing a relationship between a value I and a crystal growth rate.

A glass for chemical strengthening of the present invention will be described in detail below. However, the present invention is not limited to the following embodiments and can be carried out in any modified manner as long as not departing from the gist of the present invention.

In the present description, the phrase "chemically strengthened glass" designates a glass which has been subjected to a chemical strengthening treatment, and the phrase "glass for chemical strengthening" designates a glass which has not been subjected to a chemical strengthening treatment yet.

In the present description, a glass composition of a glass for chemical strengthening may be referred to as a base composition of a chemically strengthened glass. Normally in a chemically strengthened glass, a compressive stress layer caused by ion exchange is formed in a surface part of the glass. Therefore, a part excused from the ion exchange has a glass composition coinciding with a base composition of the chemically strengthened glass.

In the present description, any glass composition is represented by mole percentage on an oxide basis, and mol % may be abbreviated to %. In addition, the word "to" designating a numerical range is used as a denotation of a range including numerical values before and after the word "to" as a lower limit value and an upper limit value of the range.

In a glass composition, the phrase "substantially not contained" means not to be contained but unavoidable impurities contained in raw materials etc., that is, means not to be intentionally added. Specifically, the phrase means that the content in the glass composition is, for example, lower than 0.1 mol %.

The phrase "stress profile" in the present description designates a pattern expressing a compressive stress value with a depth from a glass surface as a variable. A negative compressive stress value means a tensile stress.

The word "frangibility" of a glass in the present description means a property that broken pieces are easy to scatter when the glass is broken.

In the following description, unless otherwise stated, the "surface compressive stress value" of a glass is a surface compressive stress value obtained by performing a chemical strengthening treatment on a glass sheet obtained by retaining a glass sheet having a thickness of 0.8 mm for one or more hours at a temperature 50° C. higher than a glass transition point Tg of the glass and then gradually cooling down the glass sheet at a cooling rate of 0.5° C./min. The surface compressive stress generated by the chemical strengthening treatment tends to increase as the fictive temperature of the glass is lower. The fictive temperature of the glass is influenced by a thermal history (for example, the cooling rate) which the glass received. The influence of the fictive temperature is eliminated to evaluate the surface compressive stress by the heat treatment and the gradual cooling.

In addition, a "β-OH value" is obtained by Expression (1) from a transmittance $X_1$ (%) measured at a reference wavelength of 4,000 $cm^{-1}$ by an FT-IR method, a minimum transmittance $X_2$ (%) near 3,570 $cm^{-1}$ which is an absorption wavelength of hydroxyl groups, and a thickness $\underline{t}$ (unit: mm) of the glass sheet.

$$\beta\text{-OH value}=(1/t)\log_{10}(X_1/X_2) \tag{1}$$

Incidentally, the β-OH value can be adjusted by the amount of moisture contained in glass raw materials or the melting conditions.

<Glass for Chemical Strengthening>

A glass for chemical strengthening of the present invention (hereinafter often referred to as "glass of the present invention") includes, in mole percentage on an oxide basis:

45 to 75% of $SiO_2$;
1 to 30% of $Al_2O_3$;
1 to 20% of $Li_2O$;
0 to 5% of $Y_2O_3$;
0 to 5% of $ZrO_2$; and
0 to 1% of $TiO_2$, in which,
a total content of one or more kinds of MgO, CaO, SrO, BaO and ZnO is 1 to 20%,
a total content of $Na_2O$ and $K_2O$ is 0 to 10%, and
a total content of $B_2O_3$ and $P_2O_5$ is 0 to 10%.

The glass of the present invention does not only satisfy the aforementioned composition ranges, but has a value M expressed by the following expression of 1,000 or more, $$M=-5\times[SiO_2]+121\times[Al_2O_3]+50\times[Li_2O]-35\times[Na_2O]+ \\ 32\times[K_2O]+85\times[MgO]+54\times[CaO]-41\times[SrO]-4\times \\ [P_2O_5]+218\times[Y_2O_3]+436\times[ZrO_2]-1180.$$

In the expression, $[SiO_2]$, $[Al_2O_3]$, $[Li_2O]$, $[Na_2O]$, $[K_2O]$, $[MgO]$, $[CaO]$, $[SrO]$, $[P_2O_5]$, $[Y_2O_3]$, and $[ZrO_2]$ designate contents of respective components represented by mole percentage. The same thing can be applied to the following description.

The present inventors studied the relationship between a glass composition of a glass for chemical strengthening and a compressive stress value caused by a chemical strengthening and the relationship between a glass composition of a glass for chemical strengthening and chemical strengthening property, and found that, for a glass large in the aforementioned value M, a large compressive stress value could be introduced by a chemical strengthening treatment, and devitrification (crystal) hardly occurred.

The present inventors investigated various glass compositions as to a surface compressive stress in each glass subjected to a chemical strengthening treatment, and a crystal growth rate at 850° C. to 1,200° C. As conditions for the chemical strengthening treatment, evaluation was performed on a case (one-stage chemical strengthening treatment) where a glass was chemically strengthened by immersion in sodium nitrate at 450° C. for 1 hour, and a case (two-stage chemical strengthening treatment) where a glass was chemically strengthened by immersion in sodium nitrate at 450° C. for 3 hours and subsequent immersion in potassium nitrate at 450° C. for 1.5 hours.

As a result, in a glass having a value M of 1,000 or more, a surface compressive stress (CS1) after the one-stage chemical strengthening treatment in which the glass was immersed in sodium nitrate at 450° C. for 1 hour reached 300 MPa or more. On the other hand, a surface compressive stress (CS2) after the two-stage chemical strengthening treatment in which the glass was immersed in sodium nitrate at 450° C. for 3 hours and subsequently immersed in potassium nitrate at 450° C. for 1.5 hours reached 800 MPa or more.

In the glass large in the value M, the crystal growth rate at 850 to 1,200° C. was low, and there was also confirmed a tendency that a defect caused by devitrification during manufacturing of the glass was inhibited. A method for evaluating the crystal growth rate will be described later.

The value M is more preferably 1,100 or more, and even more preferably 1,200 or more. However, when the value M is too large, there is a concern that the glass may be brittle. Therefore, the value M is preferably 1,800 or less, more preferably 1,650 or less, even more preferably 1,500 or less, and typically 1,350 or less.

In addition, the glass of the present invention does not only satisfy the aforementioned composition ranges, but has a value I expressed by the following expression of preferably 850 or less, and more preferably 600 or less.

$$I=-4.8\times[SiO_2]+102\times[Al_2O_3]+81\times[Li_2O]-272\times[Na_2O]-281\times[K_2O]-16\times[MgO]-25\times[Y_2O_3]+0.028\times[ZrO_2]+63$$

The present inventors studied a glass composition and a devitrification property of a glass for chemical strengthening, and found a high correlation between the aforementioned value I and a crystal growth rate at 700 to 1,200° C. in a glass which will be described later.

FIG. 1 is a graph in which the relationship between the value I and the crystal growth rate is plotted as to Examples and Comparative Examples which will be described later.

When the value I is preferably 850 or less and more preferably 600 or less, the glass is hardly devitrified when the glass is manufactured. The value I is more preferably 500 or less, even more preferably 400 or less, particularly preferably 300 or less, and most preferably 200 or less. The lower limit of the value I is not particularly limited. However, the value I is preferably over 50, more preferably 80 or more, and particularly preferably 100 or more, in consideration of a compressive stress value caused by chemical strengthening of the glass.

In addition, the present inventors found that the glass of the present invention does not only satisfy the aforementioned composition ranges, but has a value I2 expressed by the following expression of preferably 5 or less.

$$I2=0.27\times[SiO_2]+1.4\times[Al_2O_3]-1.1\times[Na_2O]-1.7\times[K_2O]+0.38\times[MgO]-1.36\times[Y_2O_3]-0.59\times[ZrO_2]-23$$

The present inventors studied a glass composition and a devitrification property of a glass for chemical strengthening, and found that when a glass having a glass composition small in the aforementioned value I2 was hardly devitrified when the glass was cooled down from a temperature not lower than a liquidus temperature of the glass.

The present inventors prepared glasses (A1 to A18) having compositions shown in Table 1 and Table 2. Two-stage heat treatment for retaining each glass at 1,300° C. for 30 minutes and then retaining the glass at a temperature shown in each second-stage treatment temperature field (850° C. to 1,200° C.) for 10 minutes was performed, and presence or absence of devitrification was observed. In Tables 1 and 2, presence or absence of devitrification is written for each second-stage treatment temperature, and the number of temperature conditions where devitrification occurred is added. In the tables, "N" designates that no devitrification was observed, and "●" designates that devitrification was observed. For example, in the case of the glass A3, devitrification was observed at two conditions of 850° C. and 900° C. Therefore, the number of temperature conditions where devitrification occurred is 2. It can be said that a glass small in "the number of temperature conditions with devitrification in two-stage heat treatment" meaning "the number of temperature conditions where devitrification occurred" has a low possibility to be devitrified when cooled down from high temperature, and is excellent in resistance to devitrification.

TABLE 1

|  | A1 | A2 | A3 | A4 | A5 | A6 | A7 | A8 | A9 |
|---|---|---|---|---|---|---|---|---|---|
| $SiO_2$ | 70.00 | 69.62 | 69.43 | 69.24 | 68.86 | 68.30 | 67.73 | 67.16 | 66.60 |
| $Al_2O_3$ | 7.50 | 7.99 | 8.24 | 8.49 | 8.98 | 9.72 | 10.46 | 11.19 | 11.93 |
| MgO | 7.00 | 6.67 | 6.49 | 6.32 | 5.99 | 5.48 | 4.98 | 4.48 | 3.98 |
| CaO | 0.20 | 0.20 | 0.20 | 0.20 | 0.20 | 0.20 | 0.20 | 0.20 | 0.20 |
| $ZrO_2$ | 1.00 | 1.00 | 1.00 | 1.00 | 1.00 | 1.00 | 1.00 | 1.00 | 0.99 |
| $Y_2O_3$ | — | — | — | — | — | — | — | — | — |
| $Li_2O$ | 8.00 | 8.49 | 8.74 | 8.99 | 9.48 | 10.22 | 10.96 | 11.69 | 12.43 |
| $Na_2O$ | 5.30 | 5.03 | 4.90 | 4.76 | 4.49 | 4.09 | 3.69 | 3.28 | 2.88 |
| $K_2O$ | 1.00 | 1.00 | 1.00 | 1.00 | 1.00 | 1.00 | 1.00 | 1.00 | 0.99 |
| Value I2 | 0.94 | 1.69 | 2.08 | 2.47 | 3.22 | 4.35 | 5.49 | 6.62 | 7.75 |
| 850° C. | N | N | ● | ● | ● | ● | ● | ● | ● |
| 900° C. | N | ● | ● | ● | ● | ● | ● | ● | ● |
| 950° C. | N | N | N | ● | ● | ● | ● | ● | ● |
| 1000° C. | N | N | N | ● | ● | ● | ● | ● | ● |
| 1050° C. | N | N | N | N | N | ● | ● | ● | ● |
| 1100° C. | N | N | N | N | N | N | ● | ● | ● |
| 1150° C. | N | N | N | N | N | N | N | N | ● |
| 1200° C. | N | N | N | N | N | N | N | N | N |
| Number of temperature conditions with devitrification in two-stage thermal treatment | 0 | 1 | 2 | 4 | 4 | 5 | 6 | 6 | 7 |
| Devitrification on float simulation temperature dropping condition | N | N | N | N | N | N | ● | ● | ● |

TABLE 2

|  | A10 | A11 | A12 | A13 | A14 | A15 | A16 | A17 | A18 |
|---|---|---|---|---|---|---|---|---|---|
| $SiO_2$ | 71.00 | 63.20 | 65.00 | 65.00 | 63.00 | 63.30 | 63.00 | 69.00 | 67.00 |
| $Al_2O_3$ | 7.00 | 14.30 | 11.00 | 11.00 | 12.00 | 11.00 | 10.00 | 11.00 | 11.50 |
| MgO | 6.00 | 1.00 | 4.90 | 4.90 | 5.90 | 5.90 | 6.90 | 1.90 | 2.90 |
| CaO | — | — | 0.20 | 0.20 | 0.20 | 0.20 | 0.20 | 0.20 | 0.20 |
| $ZrO_2$ | — | 1.00 | 1.00 | 1.00 | 1.00 | 1.00 | 1.00 | 1.00 | 1.00 |
| $Y_2O_3$ | — | — | — | — | — | — | 1.00 | — | — |
| $Li_2O$ | 8.50 | 13.50 | 11.00 | 11.00 | 11.00 | 11.00 | 11.00 | 10.00 | 10.50 |
| $Na_2O$ | 7.50 | 2.00 | 5.80 | 4.80 | 2.80 | 4.30 | 5.80 | 5.80 | 4.80 |
| $K_2O$ | — | 5.00 | 1.10 | 2.10 | 4.10 | 3.30 | 1.10 | 1.10 | 2.10 |
| Value I2 | 0.00 | 3.17 | 2.97 | 2.37 | 2.41 | 0.80 | 0.43 | 2.91 | 2.85 |
| 850° C. | N | • | • | • | • | N | N | N | • |
| 900° C. | N | • | • | • | • | N | N | • | N |
| 950° C. | N | • | • | • | N | N | N | • | N |
| 1000° C. | N | • | • | N | N | N | N | N | N |
| 1050° C. | N | N | N | N | N | N | N | N | N |
| 1100° C. | N | N | N | N | N | N | N | N | N |
| 1150° C. | N | N | N | N | N | N | N | N | N |
| 1200° C. | N | N | N | N | N | N | N | N | N |
| Number of temperature conditions with devitrification in two-stage thermal treatment | 0 | 4 | 4 | 3 | 2 | 0 | 0 | 2 | 1 |
| Devitrification on float simulation temperature dropping condition | N | N | N | N | N | N | N | N | N |

The value I2 is preferably 5 or less, since the glass is hardly devitrified when it is melted. The value I2 is more preferably 4 or less, even more preferably 3 or less, particularly preferably 2 or less, and most preferably 1 or less. The lower limit of the value I2 is not particularly limited. In consideration of the brittleness of the glass, the value I2 is preferably over −5, more preferably −3 or more, and particularly preferably −1 or more.

Figure 2:
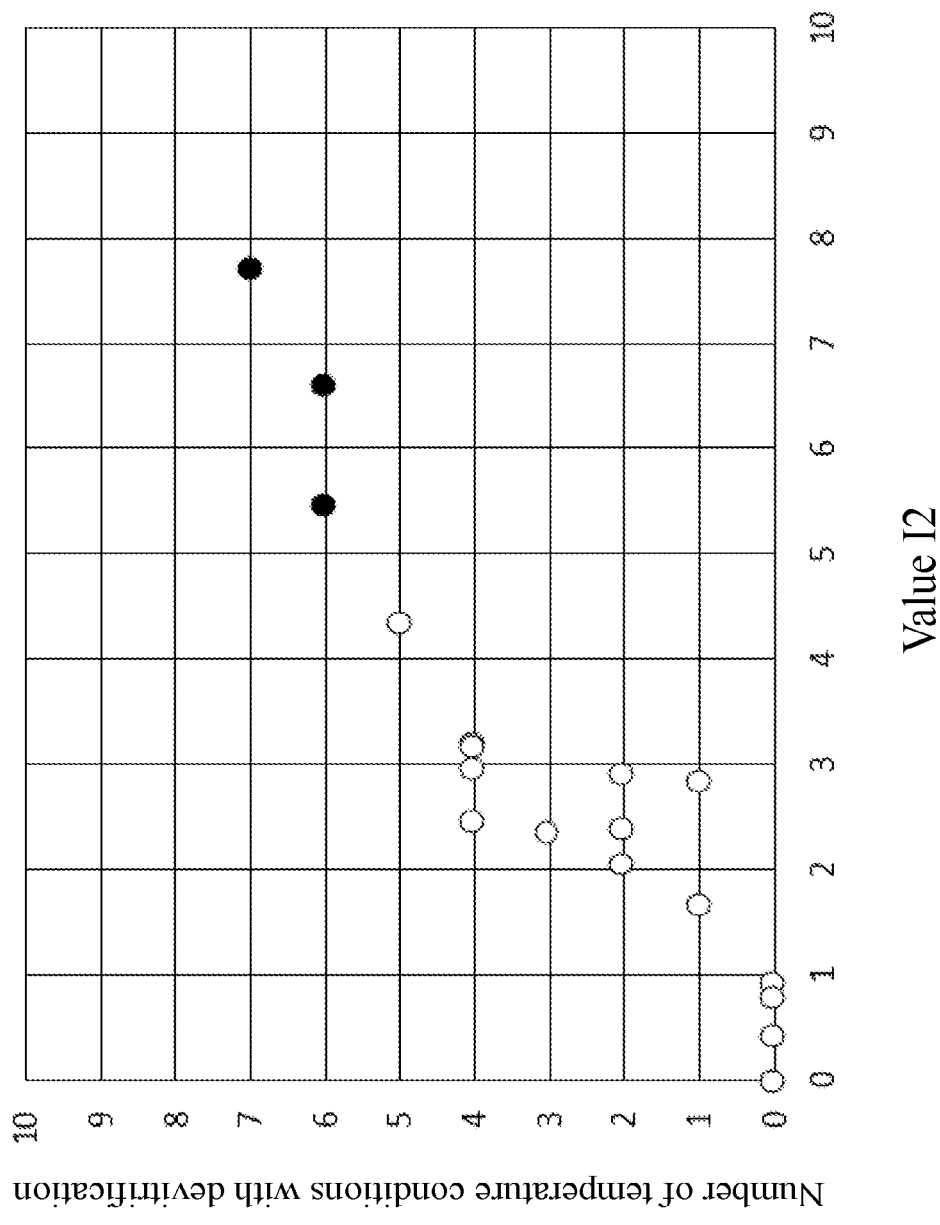
FIG. 2 is a view showing a relationship between a value I2 and a devitrification property.

Tables 1 and 2 also show results of observation as to presence or absence of devitrification at high temperature when each glass was cooled down on conditions simulating cooling conditions of a case where a glass sheet was manufactured by a float process (hereinafter referred to as "float simulation temperature dropping conditions"). The relationship between the results of those devitrification tests and the values I2 is plotted in FIG. 2. From FIG. 2, it is proved that a glass having a small value I2 is hardly devitrified when it is shaped into a glass sheet by a float process. Particularly, a glass having a value I2 of 5 or less was hardly devitrified.

On the float simulation temperature dropping conditions, the average cooling rate from 1,200° C. to 600° C. is about 15° C./min. A glass having a large number of temperature conditions where devitrification occurred in the aforementioned two-stage treatment test was also devitrified in this test.

Incidentally, in the glass of the present invention satisfying the aforementioned composition ranges, it is preferable that at least one kind of the value M, the value I and the value I2 satisfies the aforementioned ranges. It is also preferable that two kinds or all the three kinds of them satisfy the aforementioned ranges.

A preferred glass composition will be described below.

$SiO_2$ is a component forming a network of the glass. In addition, $SiO_2$ is a component enhancing the chemical durability, and it is also a component reducing occurrence of cracking when the surface of the glass is damaged.

The content of $SiO_2$ is preferably 45% or higher. The content of $SiO_2$ is more preferably 55% or higher, even more preferably 60% or higher, particularly preferably 63% or higher, and typically 65% or higher. On the other hand, in order to enhance the meltability, the content of $SiO_2$ is 75% or lower, preferably 72% or lower, more preferably 70% or lower, and particularly preferably 68% or lower.

$Al_2O_3$ is an effective component in terms of improvement of ion exchange performance in chemical strengthening and increase in a surface compressive stress after the chemical strengthening.

The content of $Al_2O_3$ is preferably 1% or higher. $Al_2O_3$ is a component raising the glass transition point and also a component increasing the Young's modulus. The content of $Al_2O_3$ is preferably 8% or higher, more preferably 9% or higher, even more preferably 10% or higher, particularly preferably 11% or higher, and typically 12% or higher. On the other hand, when the content of $Al_2O_3$ is too high, the crystal growth rate increases to aggravate a problem of reduction in yield caused by a defect of devitrification. In addition, the viscosity of the glass increases to lower the meltability. The content of $Al_2O_3$ is 30% or lower, preferably 20% or lower, more preferably 18% or lower, even more preferably 16% or lower, and typically 14% or lower.

$Li_2O$ is a component forming a surface compressive stress by the effect of ion exchange, and a component improving the meltability of the glass. When the chemically strengthened glass contains $Li_2O$, a stress profile large in both the surface compressive stress and the compressive stress layer can be obtained by a method in which Li ions in the glass surface are ion-exchanged by Na ions, and Na ions are ion-exchanged by K ions. In order to easily obtain a preferred stress profile, the content of $Li_2O$ is preferably 1% or higher, more preferably 5% or higher, even more preferably 7% or higher, particularly preferably 9% or higher, and typically 10% or higher.

On the other hand, when the content of $Li_2O$ is too high, the crystal growth rate during melting of the glass increases to aggravate a problem of reduction in yield caused by a defect of devitrification. The content of $Li_2O$ is preferably 20% or lower, more preferably 15% or lower, even more preferably 13% or lower, and typically 12% or lower.

$Na_2O$ and $K_2O$ are not essential, but they are components improving the meltability of the glass and decreasing the crystal growth rate of the glass. $Na_2O$ and $K_2O$ may be added in order to improve the ion exchange performance.

$Na_2O$ is a component forming a surface compressive stress layer in a chemical strengthening treatment using a potassium salt, and also a component which can improve the meltability of the glass.

In order to obtain those effects, the content of $Na_2O$ is preferably 1% or higher, more preferably 2% or higher, even more preferably 3% or higher, particularly preferably 4% or higher, and typically 5% or higher. On the other hand, in order to avoid reduction in surface compressive stress (CS) in a strengthening treatment using a sodium salt, the content of $Na_2O$ is preferably 10% or lower, more preferably 8% or lower, even more preferably 6% or lower, and particularly preferably 5% or lower.

$K_2O$ may be contained for a purpose such as improving the ion exchange performance. When $K_2O$ is contained, the content of $K_2O$ is preferably 0.5% or higher, more preferably 1% or higher, even more preferably 1.5% or higher, particularly preferably 2% or higher, and typically 3% or higher. On the other hand, in order to avoid reduction in surface compressive stress (CS) caused by a potassium salt, the content of $K_2O$ is preferably 10% or lower, more preferably 5% or lower, even more preferably 3% or lower, and particularly preferably 2% or lower.

The total content ($[Na_2O]+[K_2O]$) of $Na_2O$ and $K_2O$ is preferably 0 to 10%, more preferably 5% or higher, and even more preferably 6% or higher. On the other hand, the total content is more preferably 8% or lower, and particularly preferably 7% or lower.

In order to reduce the growth rate of devitrification, $[Li_2O]/([Na_2O]+[K_2O])$ is preferably 3 or lower, more preferably 2.5 or lower, and even more preferably 2 or lower. On the other hand, in order to increase the surface compressive stress in the chemical strengthening treatment using sodium, $[Li_2O]/([Na_2O]+[K_2O])$ is preferably 0.5 or higher, more preferably 0.9 or higher, and even more preferably 1.3 or higher.

In addition, in order to reduce the growth rate of devitrification, $([Al_2O_3]+[Li_2O])/([Na_2O]+[K_2O]+[MgO]+[CaO]+[SrO]+[BaO]+[ZnO]+[ZrO_2]+[Y_2O_3])$ is preferably 4 or lower, more preferably 3 or lower, and even more preferably 2 or lower. On the other hand, in order to increase the surface compressive stress in the chemical strengthening treatment using sodium, $([Al_2O_3]+[Li_2O])/([Na_2O]+[K_2O]+[MgO]+[CaO]+[SrO]+[BaO]+[ZnO]+[ZrO_2]+[Y_2O_3])$ is preferably 0.5 or higher, more preferably 0.7 or higher, even more preferably 0.9 or higher, and particularly preferably 1 or higher.

MgO, CaO, SrO, BaO and ZnO are not essential. However, in order to enhance the stability of the glass, it is preferable to contain one or more kinds of them. The total content $[MgO]+[CaO]+[SrO]+[BaO]+[ZnO]$ of them is preferably 1% or higher, more preferably 2% or higher, even more preferably 3% or higher, and particularly preferably 4% or higher. On the other hand, in order to improve the ion exchange performance in the chemical strengthening, the total content is preferably 20% or lower, more preferably 15% or lower, even more preferably 10% or lower, and further more preferably 8% or lower.

When one or more kinds of MgO, CaO, SrO, BaO and ZnO are contained, $[MgO]/([CaO]+[SrO]+[BaO]+[ZnO])$ is preferably 10 or higher, more preferably 15 or higher, even more preferably 20 or higher, and particularly preferably 25 or higher, in order to lower the surface reflectivity of the glass. Since CaO, SrO, BaO and ZnO increase the reflectivity in comparison with MgO. In order to lower the devitrification temperature, $[MgO]/([CaO]+[SrO]+[BaO]+[ZnO])$ is preferably 60 or lower, more preferably 55 or lower, even more preferably 50 or lower, and particularly preferably 45 or lower.

MgO is preferably contained in order to reduce the crystal growth rate while increasing the meltability of the chemically strengthened glass. The content of MgO is preferably 1% or higher, more preferably 2% or higher, even more preferably 3% or higher, particularly preferably 4% or higher, and typically 5% or higher. On the other hand, when the content of MgO is too high, the compressive stress layer is hardly increased in the chemical strengthening treatment. The content of MgO is preferably 15% or lower, more preferably 10% or lower, even more preferably 8% or lower, and particularly preferably 6% or lower.

CaO is a component improving the meltability of the glass for chemical strengthening. CaO may be contained. When CaO is contained, the content of CaO is preferably 0.1% or higher, more preferably 0.15% or higher, and even more preferably 0.5% or higher. On the other hand, when the content of CaO is excessive, the compressive stress value is hardly increased in the chemical strengthening treatment. The content of CaO is preferably 5% or lower, more preferably 3% or lower, even more preferably 1% or lower, and typically 0.5% or lower.

SrO is a component improving the meltability of the glass for chemical strengthening. SrO may be contained. When SrO is contained, the content of SrO is preferably 0.1% or higher, more preferably 0.15% or higher, and even more preferably 0.5% or higher. On the other hand, when the content of SrO is excessive, the compressive stress value is hardly increased in the chemical strengthening treatment. The content of SrO is preferably 3% or lower, more preferably 2% or lower, even more preferably 1% or lower, and typically 0.5% or lower.

BaO is a component improving the meltability of the glass for chemical strengthening. BaO may be contained. When BaO is contained, the content of BaO is preferably 0.1% or higher, more preferably 0.15% or higher, and even more preferably 0.5% or higher. On the other hand, when the content of BaO is excessive, the compressive stress value is hardly increased in the chemical strengthening treatment. The content of BaO is preferably 3% or lower, more preferably 2% or lower, even more preferably 1% or lower, and typically 0.5% or lower.

ZnO is a component improving the meltability of the glass for chemical strengthening. ZnO may be contained. When ZnO is contained, the content of ZnO is preferably 0.1% or higher, more preferably 0.15% or higher, and even more preferably 0.5% or higher. On the other hand, when the content of ZnO is excessive, the compressive stress value is hardly increased in the chemical strengthening treatment. The content of ZnO is preferably 3% or lower, more preferably 2% or lower, even more preferably 1% or lower, and typically 0.5% or lower.

$ZrO_2$ does not have to be contained. However, it is preferable to contain $ZrO_2$ in order to increase the surface compressive stress of the chemically strengthened glass. The content of $ZrO_2$ is preferably 0.1% or higher, more preferably 0.2% or higher, even more preferably 0.5% or higher, particularly preferably 0.8% or higher, and typically 1% or higher. On the other hand, when the content of $ZrO_2$ is too high, the compressive stress value is hardly increased in the chemical strengthening treatment. The content of $ZrO_2$ is preferably 5% or lower, more preferably 3% or lower, even more preferably 2% or lower, and particularly preferably 1.5% or lower.

$TiO_2$ is a component inhibiting solarization of the glass. $TiO_2$ may be contained. When $TiO_2$ is contained, the content of $TiO_2$ is preferably 0.02% or higher, more preferably 0.05% or higher, even more preferably 0.1% or higher, particularly preferably 0.12% or higher, and typically 0.15% or higher. On the other hand, when the content of $TiO_2$ is beyond 1%, there is a concern that devitrification may occur easily to deteriorate the quality of the chemically strengthened glass. The content of $TiO_2$ is preferably 1% or lower, more preferably 0.5% or lower, and even more preferably 0.25% or lower.

$Y_2O_3$ does not have to be contained. However, $Y_2O_3$ is a component reducing the crystal growth rate while increasing the surface compressive stress of the chemically strengthened glass. Therefore, $Y_2O_3$ is preferably contained. The content of $Y_2O_3$ is preferably 0.1% or higher, more preferably 0.2% or higher, even more preferably 0.5% or higher, particularly preferably 0.8% or higher, and typically 1% or higher. On the other hand, when the content of $Y_2O_3$ is too high, the compressive stress layer is hardly increased in the chemical strengthening treatment. The content of $Y_2O_3$ is preferably 5% or lower, more preferably 3% or lower, even more preferably 2% or lower, and particularly preferably 1.5% or lower.

$B_2O_3$ is not essential. However, $B_2O_3$ may be contained in order to reduce the brittleness of the glass to improve the crack resistance, and to improve the meltability of the glass. When $B_2O_3$ is contained, the content of $B_2O_3$ is preferably 0.5% or higher, preferably 1% or higher, and even more preferably 2% or higher. On the other hand, when the content of $B_2O_3$ is too high, the acid resistance may deteriorate easily. Therefore, the content of $B_2O_3$ is preferably 10% or lower. The content of $B_2O_3$ is more preferably 6% or lower, even more preferably 4% or lower, and typically 2% or lower. In order to prevent a problem that striae may occur during melting, it is more preferable that $B_2O_3$ is substantially not contained.

$P_2O_5$ is not essential. However, $P_2O_5$ may be contained in order to increase the compressive stress layer in chemical strengthening. When $P_2O_5$ is contained, the content of $P_2O_5$ is preferably 0.5% or higher, preferably 1% or higher, and even more preferably 2% or higher. On the other hand, in order to enhance the acid resistance, the content of $P_2O_5$ is preferably 6% or lower, more preferably 4% or lower, and even more preferably 2% or lower. In order to prevent a problem that striae may occur during melting, it is more preferable that $P_2O_5$ is substantially not contained.

The total content of $B_2O_3$ and $P_2O_5$ is preferably 0 to 10%. The lower limit of the total content is more preferably 1% or higher, and more preferably 2% or higher. On the other hand, the total content of $B_2O_3$ and $P_2O_5$ is preferably 6% or lower, and more preferably 4% or lower.

$La_2O_3$, $Nb_2O_5$, $Ta_2O_5$ and $Gd_2O_3$ are components reducing the crystal growth rate of the glass and improving the meltability. $La_2O_3$, $Nb_2O_5$, $Ta_2O_5$ and $Gd_2O_3$ may be contained. When those components are contained, the content of each component is preferably 0.1% or higher, more preferably 0.2% or higher, even more preferably 0.5% or higher, particularly preferably 0.8% or higher, and typically 1% or higher. On the other hand, when the content of those components is too high, the compressive stress value is hardly increased in the chemical strengthening treatment. Therefore, the content of each component is preferably 3% or lower, more preferably 2% or lower, even more preferably 1% or lower, and particularly preferably 0.5% or lower.

$Fe_2O_3$ absorbs heat rays and thus has an effect of improving the meltability of the glass. For mass production of glasses using a large-scale melting furnace, it is preferable to contain $Fe_2O_3$. In that case, the content of $Fe_2O_3$ is preferably 0.002% or higher, more preferably 0.005% or higher, even more preferably 0.007% or higher, and particularly preferably 0.01% or higher, as represented by weight % on the oxide basis. On the other hand, when $Fe_2O_3$ is excessively contained, the glass is colored. In order to enhance the transparency of the glass, the content of $Fe_2O_3$ is preferably 0.3% or lower, more preferably 0.04% or lower, even more preferably 0.025% or lower, and particularly preferably 0.015% or lower, as represented by weight % on the oxide basis.

Incidentally, description has been made here on the assumption that all the iron oxides in the glass are $Fe_2O_3$. In fact, however, it is common that Fe (III) in an oxidation state and Fe (II) in a reduction state are mixed. Of them, Fe (III) colors the glass in yellow, and Fe (II) colors the glass in blue. In accordance with the balance between the both, the glass is colored in green.

Further, coloring components may be added as long as not impeding the attainment of desired chemical strengthening property. Preferred examples of the coloring components include $Co_3O_4$, $MnO_2$, $NiO$, $CuO$, $Cr_2O_3$, $V_2O_5$, $Bi_2O_3$, $SeO_2$, $CeO_2$, $Er_2O_3$, and $Nd_2O_3$.

The total content of the coloring components is preferably 5% or lower, as represented by mole percentage on the oxide basis. When the total content exceeds 5%, the glass may be devitrified easily. The content of the coloring components is preferably 3% or lower, and more preferably 1% or lower. In order to increase the transmittance of the glass, it is preferable that those components are substantially not contained.

$SO_3$, chlorides, fluorides, etc. may be contained properly as refining agents during melting of the glass. It is preferable that $As_2O_3$ is not contained. When $Sb_2O_3$ is contained, the content of $Sb_2O_3$ is preferably 0.3% or lower, more preferably 0.1% or lower, and most preferably substantially not contained.

The β-OH value of the glass of the present invention is preferably 0.1 $mm^{-1}$ or more, more preferably 0.15 $mm^{-1}$ or more, even more preferably 0.2 $mm^{-1}$ or more, particularly preferably 0.22 $mm^{-1}$ or more, and most preferably 0.25 $mm^{-1}$ or more.

A glass large in β-OH value which is an index of the amount of moisture in the glass is low in softening point so as to tend to be easily bent. On the other hand, from the viewpoint of improvement of strength by chemical strengthening of the glass, the large β-OH value of the glass decreases the value of the surface compressive stress (CS) after the chemical strengthening treatment so that it is difficult to improve the strength. Therefore, the β-OH value is preferably 0.5 $mm^{-1}$ or less, more preferably 0.4 $mm^{-1}$ or less, and even more preferably 0.3 $mm^{-1}$ or less.

The Young's modulus of the glass of the present invention is preferably 80 GPa or more, more preferably 82 GPa or more, even more preferably 84 GPa or more, and particularly preferably 85 GPa or more, in order to improve the frangibility of the glass. The upper limit of the Young's modulus is not particularly limited. However, a glass high in Young's modulus may be low in acid resistance. Therefore, the Young's modulus is, for example, 110 GPa or less, preferably 100 GPa or less, and more preferably 90 GPa or less. The Young's modulus can be, for example, measured by an ultrasonic pulse method.

The density of the glass of the present invention is preferably 3.0 g/cm$^3$ or lower, more preferably 2.8 g/cm$^3$ or lower, even more preferably 2.6 g/cm$^3$ or lower, and particularly preferably 2.55 g/cm$^3$ or lower, in order to reduce the weight of a product. The lower limit of the density is not particularly limited. However, a glass having a low density tends to have a low acid resistance or the like. The density is, for example, 2.3 g/cm$^3$ or higher, preferably 2.4 g/cm$^3$ or higher, and particularly preferably 2.45 g/cm$^3$ or higher.

The refractive index of the glass of the present invention is preferably 1.6 or lower, more preferably 1.58 or lower, even more preferably 1.56 or lower, and particularly preferably 1.54 or lower, in order to reduce surface reflection of visible light. The lower limit of the refractive index is not particularly limited. However, a glass having a low refractive index tends to have a low acid resistance. Therefore the refractive index is, for example, 1.5 or higher, preferably 1.51 or higher, and more preferably 1.52 or higher.

The photoelastic constant of the glass of the present invention is preferably 33 nm/cm/MPa or lower, more preferably 32 nm/cm/MPa or lower, even more preferably 31 nm/cm/MPa or lower, and particularly preferably 30 nm/cm/MPa or lower, in order to reduce an optical strain. On the other hand, a glass having a low photoelastic constant tends to have a low acid resistance. Therefore, the photoelastic constant of the glass of the present invention is, for example, 24 nm/cm/MPa or higher, more preferably 25 nm/cm/MPa or higher, and even more preferably 26 nm/cm/MPa or higher.

The average linear thermal expansion coefficient (thermal expansion coefficient) at 50 to 350° C. in the glass of the present invention is preferably 95×10$^{-7}$/° C. or lower, more preferably 90×10$^{-7}$/° C. or lower, even more preferably 88×10$^{-7}$/° C. or lower, particularly preferably 86×10$^{-7}$/° C. or lower, and most preferably 84×10$^{-7}$/° C. or lower. The lower limit of the thermal expansion coefficient is not particularly limited. However, a glass having a low thermal expansion coefficient may be hardly melted. Therefore, the average linear thermal expansion coefficient (thermal expansion coefficient) at 50 to 350° C. in the glass of the present invention is, for example, 60×10$^{-7}$/° C. or higher, preferably 70×10$^{-7}$/° C. or higher, more preferably 74×10$^{-7}$/° C. or higher, and even more preferably 76×10$^{-7}$/° C. or higher.

The glass transition point (Tg) is preferably 500° C. or higher, more preferably 520° C. or higher, and even more preferably 540° C. or higher, in order to reduce warpage after the chemical strengthening. In terms of easiness to be formed by a float forming process, the glass transition point (Tg) is preferably 750° C. or lower, more preferably 700° C. or lower, even more preferably 650° C. or lower, particularly preferably 600° C. or lower, and most preferably 580° C. or lower.

A temperature (T2) at which the viscosity is 10$^2$ dPa·s is preferably 1,750° C. or lower, more preferably 1,700° C. or lower, particularly preferably 1,650° C. or lower, and typically 1,600° C. or lower. The temperature (T2) is a temperature indicating a melting temperature of the glass. As T2 is lower, the glass tends to be manufactured more easily. The lower limit of T2 is not particularly limited. However, a glass having a low T2 may be poor in stability. Therefore, T2 is normally 1,400° C. or higher, and preferably 1,450° C. or higher.

In addition, a temperature (T4) at which the viscosity is 10$^4$ dPa·s is preferably 1,350° C. or lower, more preferably 1,250° C. or lower, even more preferably 1,200° C. or lower, and particularly preferably 1,150° C. or lower. The temperature (T4) is a temperature indicating a temperature at which the glass is formed into a sheet shape. A glass having a higher T4 tends to cause a higher load on a forming apparatus. The lower limit of T4 is not particularly limited. However, a glass having a low T4 may be poor in stability. Therefore, T4 is normally 900° C. or higher, preferably 950° C. or higher, and more preferably 1,000° C. or higher.

The devitrification temperature of the glass of the present invention is preferably not higher than a temperature of 120° C. higher than the temperature (T4) at which the viscosity is 10$^4$ dPa·s, since devitrification does not occur easily when the glass is formed by a float process. The devitrification temperature is more preferably not higher than a temperature of 100° C. higher than T4, more preferably not higher than a temperature of 50° C. higher than T4, and particularly preferably not higher than T4.

The crystal growth rate at 850 to 1,200° C. in the glass of the present invention is preferably 600 μm/h or lower, since devitrification does not occur easily. The crystal growth rate at 850 to 1,200° C. is more preferably 500 μm/h or lower, even more preferably 400 μm/h or lower, and particularly preferably 300 μm/h or lower. In addition, the maximum crystal growth rate at 700 to 1,200° C. is preferably 600 μm/h or lower.

In addition, the crystal growth rate at 950° C. in the glass of the present invention is preferably 600 μm/h or lower, more preferably 500 μm/h or lower, even more preferably 400 μm/h or lower, and particularly preferably 300 μm/h or lower.

In addition, it is preferable that the glass of the present invention is not devitrified when it is cooled on the aforementioned float simulation temperature dropping conditions.

The softening point of the glass of the present invention is preferably 850° C. or lower, more preferably 820° C. or lower, and even more preferably 790° C. or lower. As the softening point of the glass is lower, the heat treatment temperature for bending forming is lower so that the energy consumption can be reduced, and the load on the equipment can be also reduced. In order to lower the bending forming temperature, it is more preferable that the softening point is lower. However, a normal glass for chemical strengthening has a softening point of 700° C. or higher. A glass having an excessively low softening point can easily relax a stress introduced in the chemical strengthening treatment so that the glass tends to have low strength. Therefore, the softening point is preferably 700° C. or higher. The softening point is more preferably 720° C. or higher, and even more preferably 740° C. or higher.

The softening point can be measured by a fiber elongation method according to JIS R3103-1: 2001.

In the glass of the present invention, it is preferable that a crystallization peak temperature measured by the following measuring method is higher than the softening point. In addition, it is more preferable that no crystallization peak is recognized.

That is, a glass of about 70 mg is crushed and ground in an agate mortar, and measured by a differential scanning calorimetry (DSC) from a room temperature to 1,000° C. at a temperature rising rate of 10° C./min.

The surface compressive stress value (CS1) in a case where the glass of the present invention is chemically strengthened by immersion in sodium nitrate at 450° C. for 1 hour is preferably 300 MPa or more, more preferably 350 MPa or more, and even more preferably 400 MPa or more. In order to enhance the strength, it is more preferable that the CS1 is larger. However, in order to inhibit cracking during strengthening in the chemical strengthening treatment step, the CS1 is, for example, preferably 800 MPa or less, more preferably 600 MPa or less, and even more preferably 500 MPa or less.

In addition, the depth of compressive stress layer (DOL1) in this case is preferably 70 µm or more, more preferably 80 µm or more, even more preferably 90 µm or more, and particularly preferably 100 µm or more. On the other hand, the upper limit of the DOL1 is not particularly limited. However, in a case of considering reduction in yield caused by cracking during strengthening in the chemical strengthening treatment step, the DOL1 is, for example, preferably 200 µm or less, more preferably 150 µm or less, even more preferably 130 µm or less, and particularly preferably 120 µm or less.

Incidentally, the CS1 and the DOL1 can be measured by a scattered-light photoelastic stress meter (such as SLP-1000 made by Orihara Manufacturing Co., LTD.). Alternatively, they can be measured in the following procedure using a birefringence imaging system Abrio-IM made by Tokyo Instruments, Inc.

A section of a chemically strengthened glass having a size of 10 mm×10 mm or more and a thickness of about 0.2 mm to 2 mm is polished and thinned into a range of 150 to 250 µm. A thinned sample obtained thus which has been thinned to a thickness of about 200 µm to 1 mm is measured by transmitted light using monochrome light having a wavelength of 546 nm as a light source, so as to measure a phase difference (retardation) belonging to the chemically strengthened glass by the birefringence imaging system. A stress is calculated from a value obtained thus and the following Expression (2).

$$1.28 \times F = \delta / (C \times t') \quad (2)$$

In Expression (2), F designates a stress [unit: MPa], δ designates a phase difference [unit: nm], C designates a photoelastic constant [unit: nm/cm/MPa], and t' designates a sample thickness [unit: cm].

In the case where the glass of the present invention is chemically strengthened by immersion in sodium nitrate at 450° C. for 3 hours and subsequent immersion in potassium nitrate at 450° C. for 1.5 hours, the surface compressive stress value CS2 caused by an Na—K ion-exchanged layer in this case is preferably 800 MPa or more, more preferably 850 MPa or more, even more preferably 900 MPa or more, particularly preferably 950 MPa or more, and further 1,000 MPa or more. On the other hand, the upper limit of the CS2 is not particularly limited. In order to make the reduction in yield caused by cracking during strengthening in the chemical strengthening treatment step as small as possible, the CS2 is preferably 1,500 MPa or less, more preferably 1,300 MPa or less, even more preferably 1,200 MPa or less, and particularly preferably 1,100 MPa or less.

The CS2 and the DOL2 can be, for example, measured by a surface stress meter FSM-6000 made by Orihara Manufacturing Co., LTD.

Further, in the case where the glass of the present invention is chemically strengthened by immersion in sodium nitrate at 450° C. for 3 hours and subsequent immersion in potassium nitrate at 450° C. for 1.5 hours, the depth of compressive stress layer DOL3 caused by an Li—Na ion-exchanged layer in this case is preferably 100 µm or more, more preferably 110 µm or more, even more preferably 120 µm or more, and particularly preferably 130 µm or more. On the other hand, the upper limit of the DOL3 is not particularly limited. In a case of considering the reduction in yield caused by cracking during strengthening in the chemical strengthening treatment step, for example, the DOL3 is preferably 200 µm or less, more preferably 180 µm or less, even more preferably 170 µm or less, and particularly preferably 160 µm or less.

The DOL3 can be measured by a scattered-light photoelastic stress meter (such as SLP-1000 made by Orihara Manufacturing Co., LTD.), or can be measured in the aforementioned method using the birefringence imaging system Abrio-IM made by Tokyo Instruments, Inc.

In order to increase the surface compressive stress caused by the chemical strengthening, the fictive temperature of the glass of the present invention is preferably not higher than a temperature of 80° C. higher than the glass transition point (Tg) (hereinafter referred to as "Tg+80° C."), more preferably Tg+50° C. or lower, even more preferably Tg+40° C. or lower, further more preferably Tg+30° C. or lower, even further more preferably Tg+20° C. or lower, and particularly preferably Tg+10° C. or lower.

When the glass is obtained by a method in which glass raw materials are melted at a high temperature and then cooled down, the fictive temperature of the glass becomes lower as the cooling rate after the melting decreases. Therefore, in order to obtain a glass having a very low fictive temperature, the glass has to be cooled slowly in a long time. When the glass is cooled slowly, a devitrification phenomenon that crystals are precipitated during the cooling may occur easily in some glass composition. Therefore, in consideration of the manufacturing efficiency of the glass and inhibition of the devitrification phenomenon, the fictive temperature is preferably Tg−30° C. or higher, more preferably Tg−10° C. or higher, and even more preferably Tg or higher.

Figure 3:
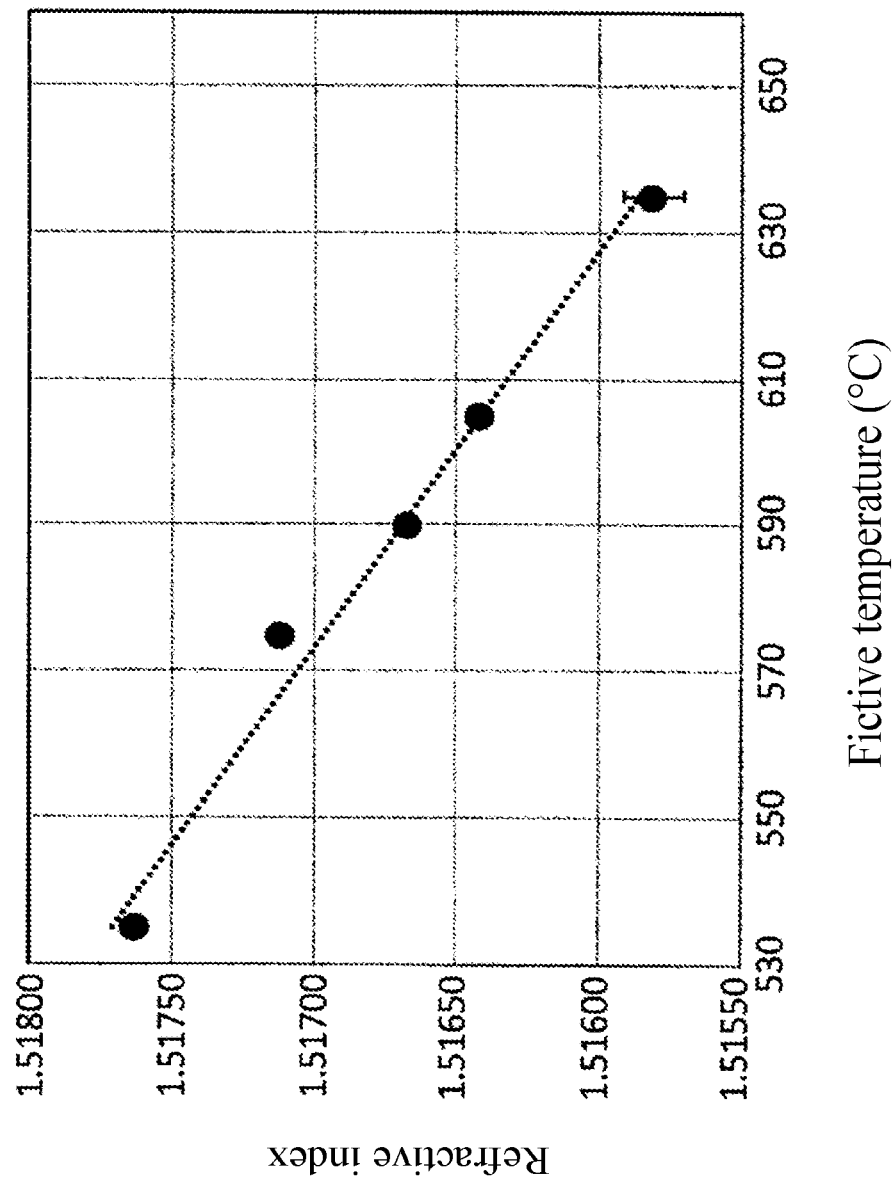
FIG. 3 is an example of a graph showing a relationship between a fictive temperature and a refractive index.

Incidentally, the fictive temperature of the glass can be obtained experimentally from the refractive index of the glass. A plurality of glass pieces each having the same composition and having different fictive temperatures are prepared in advance by a method in which each glass retained at a certain temperature is quenched from that temperature. The fictive temperatures of the glass pieces coincide with temperatures at which the glass pieces had been retained before they were quenched. Thus, the refractive indexes of the glass pieces are measured so that a calibration curve plotting the refractive indexes with respect to the fictive temperatures can be created. FIG. 3 shows an example of the calibration curve. Even for a glass with an unknown cooling rate or the like, the fictive temperature can be obtained from the calibration curve by measuring the refractive index of the glass.

However, another calibration curve has to be used for another glass composition. Therefore, it is necessary to use a calibration curve created by use of a glass having the same composition as a glass whose fictive temperature should be obtained.

The fictive temperature of a glass depends on a cooling rate at which the molten glass was cooled down. The fictive temperature tends to increase as the cooling rate increases and tends to decrease as the cooling rate decreases. In addition, as the fictive temperature is lower, the surface compressive stress after the chemical strengthening tends to increase.

The glass for chemical strengthening of the present invention can be manufactured by a common method. For example, raw materials of components of the glass are prepared, and then heated and melted in a glass melting furnace. After that, the glass is homogenized by a known method, and formed into a desired shape such as a glass sheet, followed by annealing.

Examples of the method for forming the glass sheet include a float process, a press process, a fusion process, and a down draw process. Particularly the float process suitable for mass production is preferred. Alternatively, a continuously forming method other than the float process, for example, the fusion process and the down draw process are also preferred.

After that, the formed glass is ground and polished if necessary. Thus, a glass substrate is formed. Incidentally, when the glass substrate is cut into a predetermined shape with a predetermined size or the glass substrate is chamfered, it is preferable that cutting or chamfering is performed before a chemical strengthening treatment which will be described later, so that a compressive stress layer can be also formed in an end face by the chemical strengthening treatment.

<Chemically Strengthened Glass>

The chemically strengthened glass of the present invention has a base composition the same as the aforementioned glass composition of the glass for chemical strengthening. The surface compressive stress value of the chemically strengthened glass of the present invention is preferably 800 MPa or more.

The chemically strengthened glass of the present invention can be manufactured by applying a chemical strengthening treatment to the obtained glass sheet, then washing and drying the glass sheet.

The chemical strengthening treatment can be performed by a known method. In the chemical strengthening treatment, the glass sheet is brought into contact with a melt of metal salt (such as potassium nitrate) containing metal ions (typically K ions) having large ionic radii by an immersion or the like, so that metal ions (typically Na ions or Li ions) having small ionic radii in the glass sheet are replaced by the metal ions (typically K ions for the Na ions, and Na ions for the Li ions) having large ionic radii.

The chemical strengthening treatment (ion exchange treatment) is not particularly limited. For example, the chemical strengthening treatment can be performed by immersing the glass sheet into a molten salt of potassium nitrate or the like heated to 360 to 600° C. for 0.1 hours to 500 hours. Incidentally, the heating temperature of the molten salt is preferably 375 to 500° C., and the immersing time of the glass sheet in the molten salt is preferably 0.3 hours to 200 hours.

Examples of the molten salt for the chemical strengthening treatment include nitrates, sulfates, carbonates, and chlorides. Among them, examples of the nitrates include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. Each of those molten salts may be used alone, or a plurality of kinds of them may be used in combination.

The treatment conditions of the chemical strengthening treatment are not particularly limited in the present invention. Suitable conditions may be selected in consideration of the characteristics and composition of the glass, the kind of molten salt, and the chemical strengthening property such as the surface compressive stress and the depth of compressive stress layer desired in the chemically strengthened glass obtained finally, etc.

In the present invention, the chemical strengthening treatment may be performed only once. Alternatively, a plurality of times of the chemical strengthening treatment (multistage strengthening) may be performed on two or more different conditions. Here, for example, as a first stage of the chemical strengthening treatment, a chemical strengthening treatment is performed on conditions where the DOL can be increased and the CS can be decreased relatively. After that, as a second stage of the chemical strengthening treatment, a chemical strengthening treatment is performed on conditions where the DOL can be decreased and the CS can be increased relatively. Thus, it is possible to suppress an internal tensile stress area (St) while increasing the CS in the outermost surface of the chemically strengthened glass. As a result, it is possible to suppress the internal tensile stress (CT) to a low value.

When the glass for chemical strengthening of the present invention has a sheet-like shape (glass sheet), the sheet thickness (t) thereof is not particularly limited. However, in order to enhance the chemical strengthening effect, the thickness is, for example, 2 mm or less, preferably 1.5 mm or less, more preferably 1 mm or less, even more preferably 0.9 mm or less, particularly preferably 0.8 mm or less, and most preferably 0.7 mm or less. On the other hand, in order to obtain an effect of improving the strength sufficiently by the chemical strengthening treatment, the sheet thickness is, for example, 0.1 mm or more, preferably 0.2 mm or more, more preferably 0.4 mm or more, and even more preferably 0.5 mm or more.

The shape of the glass of the present invention may have another shape than the sheet-like shape in accordance with a product, a usage, or the like to which the glass should be applied. In addition, the glass sheet may have a bordered shape different in peripheral thickness, or the like. Further, the form of the glass sheet is not limited thereto. For example, the glass sheet may have two main surfaces not parallel to each other, or one of the two main surfaces or all or a part of the both may be curved. More specifically, the glass sheet may be, for example, a flat glass sheet free from warpages or a curved glass sheet having a curved surface.

The glass of the present invention is useful particularly as a cover glass for use in a mobile apparatus or the like such as a cellular phone, a smartphone, a personal digital assistant (PDA), or a tablet terminal. Further, it is also useful as a thing not intended to be portable, such as a cover glass for a display device such as a television (TV), a personal computer (PC), or a touch panel, an elevator wall surface, a wall surface (whole-surface display) of an architecture such as a house or a building, a construction material such as a window glass, a table top, or an interior decoration for a car, an airplane or the like or a cover glass for them. In addition, the glass of the present invention is also useful for an application such as a housing which has not a sheet-like shape but a curved shape formed by bending or forming.

EXAMPLES

The present invention will be described along its examples below. However, the present invention is not limited thereto. Example 25 is a comparative example, and the other examples are working examples. Incidentally, as for respective measurement results in the tables, blanks designate unmeasured items.

(Preparation of Glass for Chemical Strengthening)

Glass sheets were prepared by melting in a platinum crucible so as to have glass compositions represented by mole percentage on an oxide basis shown in Tables 3 to 6 respectively. Glass raw materials used generally, such as oxides, hydroxides, carbonates, or nitrates, were selected suitably, and weighed to obtain a glass of 1,000 g. Next, the mixed glass raw materials were put into the platinum crucible, and placed in a resistance-heating type electric furnace at 1,500 to 1,700° C. Thus, the glass raw materials were melted for about 3 hours to be degassed and homogenized. The obtained molten glass was poured into a mold, and retained at a temperature of 50° C. higher than a glass transition point for 1 hour. After that, the molten glass was cooled down to a room temperature at a rate of 0.5° C./min. Thus, a glass block was obtained. The obtained glass block was cut and ground, and the both sides thereof were finished into mirror surfaces, thereby obtaining a sheet-like glass measuring 50 mm in length, 50 mm in width and 0.8 mm in thickness.

Physical properties of each glass obtained thus was evaluated as follows. Results are shown in Tables 3 to 6.

<Density>

Density was measured by an in-liquid weighing method (JIS Z8807: 2012 Methods of measuring density and specific gravity of solid). The unit is g/cm$^3$.

<Young's Modulus>

As for each glass that had not been chemically strengthened yet, the Young's modulus (E) (unit: GPa) was measured by an ultrasonic pulse method (JIS R1602: 1995).

<Average Linear Expansion Coefficient and Glass Transition Point (Tg)>

The average linear expansion coefficient ($\alpha$50-350) at a temperature of 50 to 350° C. (unit: $10^{-7}$/° C.) and the glass transition point were measured according to a method of JIS R3102: 1995 "Testing method for average linear thermal expansion of glass".

<T2, T4>

As for each glass that had not been chemically strengthened yet, the temperature T2 at which the viscosity was $10^2$ dPa·s and the temperature T4 at which the viscosity was $10^4$ dPa·s were measured by a rotary viscometer (according to ASTM C 965-96)

<DSC Peak Height>

DSC measurement was carried out by the aforementioned method to measure a peak height (unit: mcal/s).

<Crystal Growth Rate>

The crystal growth rate was measured in the following procedure.

A glass piece was crushed in a mortar, and classified. Grass particles which had been passed through a sieve of 3.35 mm meshes but had not been passed through a sieve of 2.36 meshes were washed with ion-exchanged water, and dried. The glass particles obtained thus were used for testing.

Figure 4:
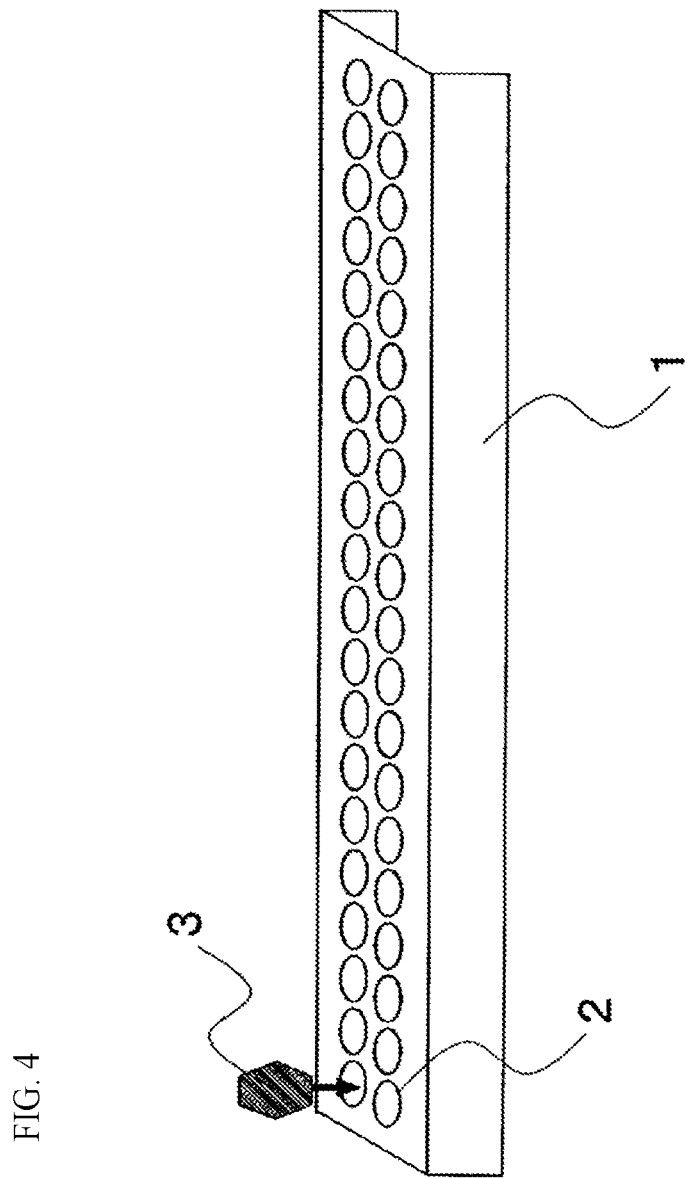
FIG. 4 is a schematic view of a platinum vessel used for measuring a crystal growth rate.

As shown in FIG. 4, glass particles 3 were put one by one on concave portions 2 of a long and narrow platinum cell (platinum cell 1 for evaluating devitrification) having a large number of concave portions, and heated in an electric furnace at 1,000 to 1,100° C. until the surfaces of the glass particles were melted to be smooth.

Next, the glass was placed into a furnace with a temperature gradient, which was kept in a predetermined temperature, so that the glass was subjected to a heat treatment for a fixed time (T). After the heat treatment, the glass was transferred to a room temperature so as to be quenched. Owing to this method, a large number of glass particles can be heated simultaneously by placing the long and narrow vessel in the furnace with a temperature gradient. Thus, a maximum crystal growth rate can be measured within a predetermined temperature range.

The glass subjected to the heat treatment was observed by a polarizing microscope (ECLIPSE LV100ND made by Nikon Corporation). Among observed crystals, the diameter (L μm) of the largest one was measured. Observation was performed on conditions of an eyepiece of 10 power, an objective lens of 5 to 100 power, transmitted light and polarizing observation. A crystal caused by devitrification may be considered to grown up isotropically. Therefore, the crystal growth rate is L/(2T) [unit: μm/h].

Incidentally, a crystal that was not precipitated from the interface with the vessel was selected as a crystal to be measured, because crystal growth in a metal interface tends to indicate a different behavior from that of crystal growth that occurs inside the glass or in a glass-atmosphere interface.

<Devitrification Temperature>

Crushed glass particles were put into a platinum dish, and subjected to a heat treatment for 17 hours in an electric furnace controlled to a fixed temperature. After the heat treatment, the glass was observed by a polarizing microscope, and a devitrification temperature was estimated by a method for evaluating presence or absence of devitrification. For example, "1050-1078° C." written in the table means that the glass was devitrified by a heat treatment at 1,050° C. but the glass was not devitrified by a treatment at 1,078° C. In this case, the devitrification temperature was 1,050° C. or higher and lower than 1,078° C.

<Devitrification in Float Simulation Temperature Dropping>

A columnar glass sample measuring about ɸ20 mm by 15 mm was prepared from the glass block. The columnar glass sample was put into a ɸ40 mm crucible made of a platinum-gold alloy, and subjected to a hyperthermic treatment in an electric furnace simulating temperature dropping conditions in a float furnace. After that, presence or absence of devitrification on the atmospheric surface side (fire-polished side) of the sample was evaluated by an optical microscope. "N" in the tables designates no recognition of devitrification.

Figure 5:
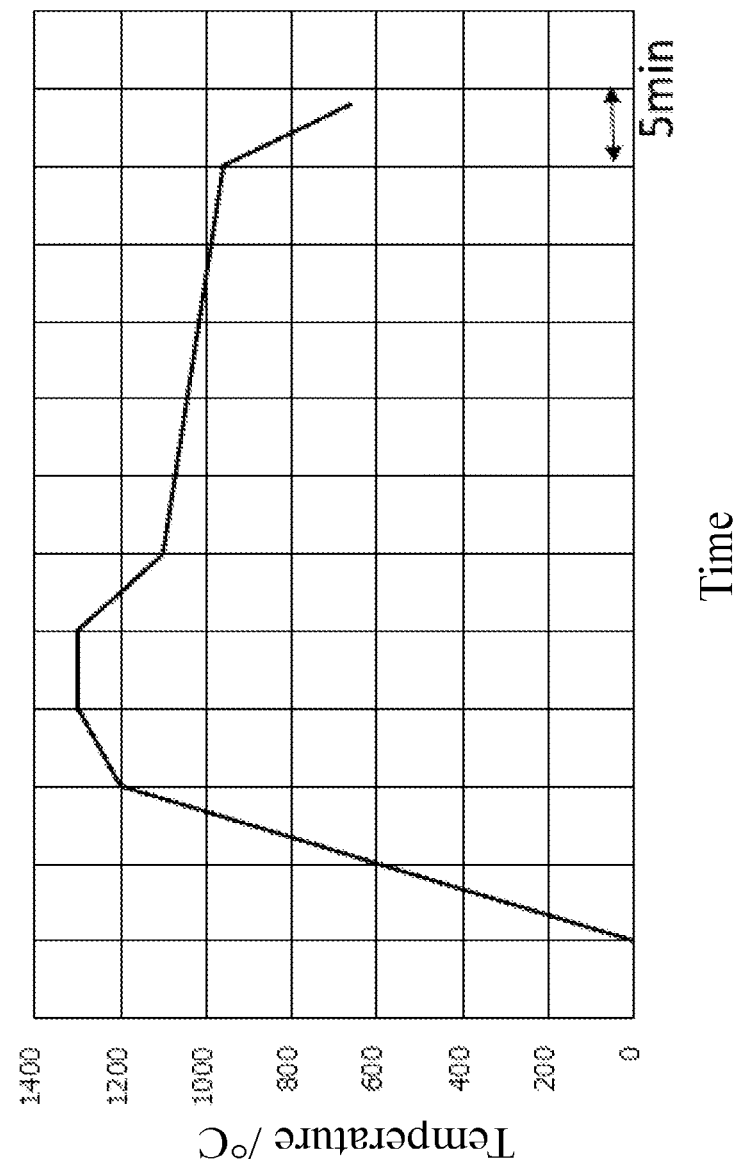
FIG. 5 is a temperature profile on float simulation temperature dropping conditions.

Incidentally, glass viscosity η (unit: dPa·s) during temperature dropping was made to follow that during float forming. That is, the temperature was decreased for 5 minutes from 1,300° C. to a temperature at which log η reached about 4.4. Next, the temperature was decreased for 25 minutes to a temperature at which log reached about 5.5. After that, the temperature was decreased for 4 minutes to a temperature at which log η reached about 9.9. The glass was then cooled down at a cooling rate low enough to prevent the glass from cracking. Therefore, a temperature program during the temperature dropping depends on the glass composition. A temperature program for Glass A1 in Table 1 is shown in FIG. 5 by way of example.

<Refractive Index>

A refractive index on d-line (He light source, wavelength 587.6 nm) was measured by a precision refractometer (KPR-2000 made by Shimadzu Corporation).

<Photoelastic Constant>

A photoelastic constant was measured using a sodium lamp as a light source according to a method of compression on a circular plate described in Journal of the Ceramic Association, Japan, Vol. 87, (1979) No. 1010, p. 519.

<Chemical Strengthening Property>

The surface compressive stresses CS1 and CS3 (unit: MPa) and the depth of compressive stress layers DOL1 and DOL3 (unit: μm) were measured by a meter SLP1000 made by Orihara Manufacturing Co., LTD. The surface compressive stress (CS2) (unit: MPa) and the depth of compressive stress layer (DOL2) (unit: μm) were measured by a surface stress meter FSM-6000 made by Orihara Manufacturing Co., LTD.

Incidentally, the CS1 and the DOL1 in the tables designate a surface compressive stress and a depth of compressive stress layer after one-stage strengthening in which the obtained glass for chemical strengthening was chemically strengthened by immersion in sodium nitrate at 450° C. for 1 hour, respectively. The CS2 and the DOL2 designate a surface compressive stress and a depth of compressive stress layer in an Na—K ion-exchanged layer after two-stage strengthening in which the obtained glass for chemical strengthening was chemically strengthened by immersion in sodium nitrate at 450° C. for 3 hours and subsequent immersion in potassium nitrate at 450° C. for 1.5 hours, respectively. In addition, the CS3 and the DOL3 designate a surface compressive stress and a depth of compressive stress layer in an Li—Na ion-exchanged layer after two-stage strengthening in which the obtained glass for chemical strengthening was chemically strengthened by immersion in sodium nitrate at 450° C. for 3 hours and subsequent immersion in potassium nitrate at 450° C. for 1.5 hours, respectively.

TABLE 3

|  | Ex. 1 | Ex. 2 | Ex. 3 | Ex. 4 | Ex. 5 | Ex. 6 |
|---|---|---|---|---|---|---|
| $SiO_2$ | 66.9 | 62.9 | 62.9 | 61.9 | 62.9 | 66.9 |
| $Al_2O_3$ | 10.5 | 10.0 | 9.0 | 9.0 | 10.0 | 11.0 |
| $B_2O_3$ | 0.0 | 0.0 | 0.0 | 0.0 | 0.0 | 0.0 |
| $P_2O_5$ | 0.0 | 0.0 | 0.0 | 0.0 | 1.0 | 0.0 |
| MgO | 3.9 | 6.9 | 6.9 | 6.9 | 6.9 | 5.9 |
| CaO | 0.2 | 0.2 | 0.2 | 0.2 | 0.2 | 0.2 |
| SrO | 0.0 | 0.0 | 0.0 | 0.0 | 0.0 | 0.0 |
| BaO | 0.0 | 0.0 | 0.0 | 0.0 | 0.0 | 0.0 |
| ZnO | 0.0 | 0.0 | 0.0 | 0.0 | 0.0 | 0.0 |
| $TiO_2$ | 0.1 | 0.0 | 0.1 | 0.1 | 0.1 | 0.1 |
| $ZrO_2$ | 1.0 | 1.0 | 1.0 | 1.0 | 1.0 | 1.0 |
| $Y_2O_3$ | 0.5 | 1.0 | 2.0 | 3.0 | 1.0 | 1.0 |
| $Li_2O$ | 10.5 | 11.0 | 11.0 | 11.0 | 11.0 | 8.0 |
| $Na_2O$ | 4.8 | 5.8 | 5.8 | 5.8 | 4.8 | 4.8 |
| $K_2O$ | 1.6 | 1.1 | 1.1 | 1.1 | 1.1 | 1.1 |
| Sum | 100.0 | 99.9 | 100.0 | 100.0 | 100.0 | 100.0 |
| Value M | 1048 | 1360 | 1457 | 1680 | 1391 | 1256 |
| Value I | 476 | 254 | 127 | 97 | 526 | 420 |
| Value I2 | 2.0 | 0.4 | −2.4 | −4.0 | 1.5 | 3.6 |
| Density (g/cm$^3$) | 2.47 | 2.54 | 2.60 | 2.66 | 2.53 | 2.51 |
| E (GPa) | 85 | 91 | 90 | 93 | 88 | 88 |
| α50-350 ($10^{-7}$/° C.) | 77 | 84 | 84 | 86 | 89 | 67 |
| Tg (° C.) | 554 | 548 | 557 | 568 | 563 | 611 |
| T2 (° C.) | 1599 | 1460 | 1446 | 1418 | 1483 | 1613 |
| T4 (° C.) | 1143 | 1057 | 1037 | 1022 | 1069 | 1186 |
| Devitrification temperature (° C.) | 1118 or lower | 1050-1078 | 1099-1129 | 1198-1225 | 1070-1096 | 1181-1205 |
| DSC peak height mcal/s | 2.47 | 1.42 | 0.83 | 0.76 | 2.67 | 2.78 |
| Crystal growth rate | 433 | 306 | 103 | 77 | 524 | 421 |
| Devitrification during float simulation temperature dropping |  | N |  |  |  | N |
| Refractive index |  | 1.537 | 1.545 | 1.554 |  |  |
| Photoelastic constant |  | 26.8 | 26.3 | 25.9 |  |  |
| CS1 | 341 | 347 | 334 | 348 | 379 | 314 |
| DOL1 | 100 | 85 | 82 | 81 | 110 | 111 |
| CS2 | 861 | 991 | 1078 | 1219 | 1021 | 1205 |
| DOL2 | 10.4 | 6.7 | 5.6 | 4.4 | 7.9 | 8.0 |
| CS3 | 248 | 259 | 263 | 280 | 276 | 257 |
| DOL3 | 152 | 131 | 121 | 111 | 130 | 149 |

|  | Ex. 7 | Ex. 8 | Ex. 9 | Ex. 10 | Ex. 11 |
|---|---|---|---|---|---|
| $SiO_2$ | 65.1 | 62.9 | 62.9 | 65.9 | 64.6 |
| $Al_2O_3$ | 10.5 | 11.0 | 10.5 | 11.5 | 10.8 |
| $B_2O_3$ | 0.0 | 0.0 | 0.0 | 0.0 | 0.0 |
| $P_2O_5$ | 0.0 | 0.0 | 0.0 | 0.0 | 0.0 |
| MgO | 6.4 | 5.9 | 5.9 | 3.9 | 5.4 |
| CaO | 0.0 | 0.2 | 0.2 | 0.2 | 0.2 |
| SrO | 0.0 | 0.0 | 0.0 | 0.0 | 0.0 |
| BaO | 0.0 | 0.0 | 0.0 | 0.0 | 0.0 |
| ZnO | 0.0 | 0.0 | 0.0 | 0.0 | 0.0 |

TABLE 3-continued

| | | | | | |
|---|---|---|---|---|---|
| TiO$_2$ | 0.1 | 0.0 | 0.1 | 0.1 | 0.1 |
| ZrO$_2$ | 1.0 | 1.0 | 1.0 | 1.0 | 1.0 |
| Y$_2$O$_3$ | 1.0 | 1.0 | 1.0 | 0.5 | 0.8 |
| Li$_2$O | 9.5 | 11.0 | 11.0 | 10.5 | 10.3 |
| Na$_2$O | 5.3 | 5.8 | 5.8 | 4.8 | 5.3 |
| K$_2$O | 1.1 | 1.1 | 1.6 | 1.6 | 1.4 |
| Sum | 100.0 | 99.9 | 100.0 | 100.0 | 100.0 |
| Value M | 1296 | 1391 | 1347 | 1174 | 1276 |
| Value I | 338 | 372 | 181 | 573 | 363 |
| Value I2 | 2.1 | 1.4 | −0.1 | 3.1 | 1.7 |
| Density (g/cm$^3$) | 2.52 | 2.53 | 2.53 | 2.48 | 2.51 |
| E (GPa) | 89 | 90 | 89 | 86 | 87 |
| α50-350 (10$^{-7}$/° C.) | 77 | 82 | 85 | 77 | 80 |
| Tg (° C.) | 577 | 553 | 541 | 565 | 561 |
| T2 (° C.) | 1560 | 1506 | 1495 | 1604 | 1553 |
| T4 (° C.) | 1132 | 1083 | 1072 | 1152 | 1118 |
| Devitrification temperature (° C.) | 1131-1155 | 1110-1135 | 1045 or lower | 1126 or lower | 1093 or lower |
| DSC peak height mcal/s | 2.10 | 2.07 | 1.21 | 3.00 | 2.11 |
| Crystal growth rate | 378 | 407 | 183 | 489 | 328 |
| Devitrification during float simulation temperature dropping | | | | | |
| Refractive index | | | | | |
| Photoelastic constant | | | | | |
| CS1 | 330 | 366 | 344 | 367 | 347 |
| DOL1 | 98 | 93 | 86 | 103 | 96 |
| CS2 | 1098 | 1006 | 954 | 915 | 989 |
| DOL2 | 7.3 | 7.5 | 8.3 | 10.3 | 8.6 |
| CS3 | 258 | 264 | 262 | 261 | 260 |
| DOL3 | 140 | 136 | 131 | 151 | 140 |

TABLE 4

| | Ex. 12 | Ex. 13 | Ex. 14 | Ex. 15 | Ex. 16 | Ex. 17 |
|---|---|---|---|---|---|---|
| SiO$_2$ | 63.8 | 64.9 | 64.3 | 66.9 | 65.7 | 65.4 |
| Al$_2$O$_3$ | 10.7 | 10.5 | 10.6 | 10.0 | 10.2 | 10.9 |
| B$_2$O$_3$ | 0.0 | 0.0 | 0.0 | 0.0 | 0.0 | 0.0 |
| P$_2$O$_5$ | 0.0 | 0.0 | 0.0 | 0.0 | 0.0 | 0.0 |
| MgO | 5.6 | 4.9 | 5.3 | 4.3 | 5.4 | 4.0 |
| CaO | 0.2 | 0.2 | 0.2 | 0.2 | 0.2 | 0.2 |
| SrO | 0.0 | 0.0 | 0.0 | 0.0 | 0.0 | 0.0 |
| BaO | 0.0 | 0.0 | 0.0 | 0.0 | 0.0 | 0.0 |
| ZnO | 0.0 | 0.0 | 0.0 | 0.0 | 0.0 | 0.0 |
| TiO$_2$ | 0.1 | 0.1 | 0.1 | 0.1 | 0.1 | 0.1 |
| ZrO$_2$ | 1.0 | 1.0 | 1.0 | 1.0 | 1.3 | 1.0 |
| Y$_2$O$_3$ | 0.9 | 0.7 | 0.8 | 0.7 | 0.5 | 0.5 |
| Li$_2$O | 10.7 | 10.7 | 10.7 | 10.1 | 10.2 | 10.5 |
| Na$_2$O | 5.5 | 5.3 | 5.4 | 5.5 | 5.2 | 5.5 |
| K$_2$O | 1.5 | 1.6 | 1.6 | 1.2 | 1.2 | 1.5 |
| Sum | 100.0 | 100.0 | 100.0 | 100.0 | | |
| Value M | 1311 | 1197 | 1254 | 1010 | 1241 | 1221 |
| Value I | 272 | 328 | 300 | 303 | 395 | 338 |
| Value I2 | 0.8 | 0.9 | 0.8 | 1.1 | 1.9 | 1.4 |
| Density (g/cm$^3$) | 2.52 | 2.50 | 2.51 | 2.49 | 2.50 | 2.49 |
| E (GPa) | 87 | 86 | 86 | 85 | 86 | 85 |
| α50-350 (10$^{-7}$/° C.) | 82 | 81 | 82 | 78 | 77 | 80 |
| Tg (° C.) | 552 | 548 | 550 | 555 | 557 | 554 |
| T2 (° C.) | 1505 | 1547 | 1536 | 1571 | 1566 | 1576 |
| T4 (° C.) | 1091 | 1107 | 1101 | 1128 | 1128 | 1131 |
| Devitrification temperature (° C.) | 1045 or lower | 1082 or lower | 1076 or lower | 1107 or lower | 1127-1151 | 1131 or lower |
| DSC peak height mcal/s | 1.66 | 1.84 | 1.75 | 1.84 | 1.91 | 1.79 |
| Crystal growth rate | 366 | 223 | 295 | 279 | 342 | 287 |

TABLE 4-continued

|  | | | | | | |
|---|---|---|---|---|---|---|
| Devitrification during float simulation temperature dropping | N | | | N | | |
| Refractive index | 1.533 | | | 1.526 | 1.529 | 1.528 |
| Photoelastic constant | | | | | | |
| CS1 | 346 | 342 | 344 | 307 | 341 | 343 |
| DOL1 | 91 | 93 | 92 | 102 | 98 | 101 |
| CS2 | 972 | 908 | 940 | 900 | 969 | 913 |
| DOL2 | 8.5 | 9.4 | 8.9 | 9.7 | 8.6 | 10.2 |
| CS3 | 261 | 255 | 258 | 229 | 255 | 252 |
| DOL3 | 136 | 141 | 138 | 152 | 145 | 148 |

|  | Ex. 18 | Ex. 19 | Ex. 20 | Ex. 21 | Ex. 22 |
|---|---|---|---|---|---|
| $SiO_2$ | 64.5 | 63.4 | 66.1 | 65.2 | 65.2 |
| $Al_2O_3$ | 10.9 | 11.2 | 11.2 | 11.3 | 11.3 |
| $B_2O_3$ | 0.0 | 0.0 | 0.0 | 0.0 | 0.0 |
| $P_2O_5$ | 0.0 | 0.0 | 0.0 | 0.0 | 0.0 |
| MgO | 5.0 | 6.0 | 3.1 | 4.1 | 4.4 |
| CaO | 0.2 | 0.2 | 0.2 | 0.2 | 0.2 |
| SrO | 0.0 | 0.0 | 0.0 | 0.0 | 0.0 |
| BaO | 0.0 | 0.0 | 0.0 | 0.0 | 0.0 |
| ZnO | 0.0 | 0.0 | 0.0 | 0.0 | 0.0 |
| $TiO_2$ | 0.1 | 0.1 | 0.1 | 0.1 | 0.1 |
| $ZrO_2$ | 1.0 | 1.2 | 1.3 | 1.4 | 1.4 |
| $Y_2O_3$ | 0.5 | 0.0 | 0.5 | 0.3 | 0.0 |
| $Li_2O$ | 10.7 | 10.8 | 10.4 | 10.3 | 10.3 |
| $Na_2O$ | 5.5 | 5.6 | 5.6 | 5.6 | 5.6 |
| $K_2O$ | 1.5 | 1.5 | 1.5 | 1.5 | 1.5 |
| Sum | | | | | |
| Value M | 1194 | 1301 | 1159 | 1261 | 1222 |
| Value I | 333 | 344 | 358 | 345 | 348 |
| Value I2 | 1.7 | 2.7 | 1.5 | 2.0 | 2.6 |
| Density (g/cm$^3$) | 2.49 | 2.48 | 2.49 | 2.48 | 2.47 |
| E (GPa) | 86 | 85 | 85 | 85 | 84 |
| α50-350 (10$^{-7}$/° C.) | 81 | 82 | 81 | 82 | 83 |
| Tg (° C.) | 546 | 537 | 558 | 562 | 549 |
| T2 (° C.) | 1551 | 1536 | 1586 | 1586 | 1587 |
| T4 (° C.) | 1111 | 1105 | 1142 | 1141 | 1142 |
| Devitrification temperature (° C.) | 1112 or lower | 1131 or higher | 1120-1146 | 1190 or higher | 1167-1191 |
| DSC peak height mcal/s | 1.94 | 1.78 | 1.96 | 1.82 | 1.80 |
| Crystal growth rate | 334 | 289 | 320 | 280 | 278 |
| Devitrification during float simulation temperature dropping | | | N | | |
| Refractive index | 1.529 | 1.528 | 1.526 | 1.527 | 1.524 |
| Photoelastic constant | | | | | |
| CS1 | 344 | 359 | 339 | 346 | 344 |
| DOL1 | 95 | 91 | 107 | 103 | 102 |
| CS2 | 902 | 903 | 895 | 931 | 901 |
| DOL2 | 9.5 | 9.0 | 11.0 | 10.3 | 10.4 |
| CS3 | 252 | 263 | 246 | 256 | 253 |
| DOL3 | 144 | 141 | 154 | 149 | 150 |

TABLE 5

|  | Ex. 23 | Ex. 24 | Ex. 25 | Ex. 26 | Ex. 27 | Ex. 28 | Ex. 29 |
|---|---|---|---|---|---|---|---|
| $SiO_2$ | 64.4 | 64.8 | 70.0 | 69.9 | 66.9 | 67.5 | 71.4 |
| $Al_2O_3$ | 11.2 | 11.5 | 10.0 | 7.5 | 11.5 | 9.6 | 9.0 |
| $B_2O_3$ | 0.0 | 0.4 | 0.0 | 0.0 | 0.0 | 0.0 | 0.0 |
| $P_2O_5$ | 0.0 | 0.0 | 0.0 | 0.0 | 0.0 | 1.0 | 0.0 |
| MgO | 5.0 | 0.0 | 5.0 | 7.0 | 2.9 | 5.4 | 3.5 |
| CaO | 0.2 | 0.8 | 0.0 | 0.2 | 0.2 | 0.2 | 0.2 |
| SrO | 0.0 | 0.1 | 0.0 | 0.0 | 0.0 | 0.0 | 0.0 |
| BaO | 0.0 | 0.0 | 0.0 | 0.0 | 0.0 | 0.0 | 0.0 |
| ZnO | 0.0 | 0.1 | 0.0 | 0.0 | 0.0 | 0.0 | 0.0 |
| $TiO_2$ | 0.1 | 0.0 | 0.0 | 0.1 | 0.1 | 0.1 | 0.1 |
| $ZrO_2$ | 1.4 | 1.8 | 1.0 | 1.0 | 1.0 | 1.0 | 1.0 |
| $Y_2O_3$ | 0.0 | 0.0 | 0.0 | 0.0 | 0.0 | 0.0 | 1.0 |

TABLE 5-continued

|  | Ex. 23 | Ex. 24 | Ex. 25 | Ex. 26 | Ex. 27 | Ex. 28 | Ex. 29 |
|---|---|---|---|---|---|---|---|
| $Li_2O$ | 10.5 | 10.6 | 10.0 | 8.0 | 10.5 | 10.1 | 9.0 |
| $Na_2O$ | 5.6 | 10.0 | 3.0 | 5.3 | 4.8 | 4.0 | 4.0 |
| $K_2O$ | 1.6 | 0.0 | 1.0 | 1.0 | 2.1 | 1.0 | 0.8 |
| Sum |  | 100.0 | 100.0 | 100.0 | 100.0 | 100.0 | 100.0 |
| Value M | 1281 | 866 | 973 | 679 | 986 | 946 | 845 |
| Value I | 312 | −343 | 1052 | −22 | 466 | 723 | 659 |
| Value I2 | 2.3 | −1.7 | 6.2 | 0.9 | 2.8 | 4.1 | 2.5 |
| Density (g/cm³) | 2.47 | 2.47 | 2.42 | 2.44 | 2.45 | 2.44 | 2.48 |
| E (GPa) | 85 | 84 | 84 | 83 | 85 | 85 | 85 |
| α50-350 ($10^{-7}$/° C.) | 81 | 89 | 63 | 72 | 78 | 73 | 66 |
| Tg (° C.) | 550 | 513 | 585 | 548 | 550 | 567 | 593 |
| T2 (° C.) | 1564 | 1551 | 1675 | 1629 | 1632 | 1625 | 1675 |
| T4 (° C.) | 1126 | 1088 | 1211 | 1159 | 1165 | 1173 | 1203 |
| Devitrification temperature (° C.) | 1175 or higher |  | 1194-1200 | 1090-1100 | 1073-1100 | 1144-1170 |  |
| DSC peak height mcal/s | 1.58 | 0.55 | 4.62 | 0.45 | 2.57 | 3.55 | 3.31 |
| Crystal growth rate | 228 | 20 | 1078 | 24 | 477 | 696 | 691 |
| Devitrification during float simulation temperature dropping |  |  |  | N |  |  |  |
| Refractive index | 1.526 |  | 1.517 | 1.517 |  |  |  |
| Photoelastic constant |  |  | 29.1 | 28.9 |  |  |  |
| CS1 | 350 | 229 | 380 | 203 | 345 | 345 | 303 |
| DOL1 | 96 | 129 | 108 | 97 | 103 | 124 | 117 |
| CS2 | 903 | 742 | 906 | 908 | 781 | 875 | 981 |
| DOL2 | 10.0 | 12.2 | 9.0 | 8.8 | 12.5 | 10.2 | 9.3 |
| CS3 | 260 | 151 | 261 | 193 | 248 | 244 | 226 |
| DOL3 | 145 | 173 | 164 | 155 | 157 | 155 | 166 |

TABLE 6

|  | Ex. 30 | Ex. 31 | Ex. 32 | Ex. 33 | Ex. 34 | Ex. 35 | Ex. 36 | Ex. 37 |
|---|---|---|---|---|---|---|---|---|
| $SiO_2$ | 67.0 | 66.5 | 66.0 | 68.5 | 66.5 | 66.5 | 64.0 | 64.0 |
| $Al_2O_3$ | 10.8 | 10.3 | 12.0 | 10.4 | 11.7 | 10.6 | 13.0 | 13.0 |
| $B_2O_3$ |  |  |  |  |  |  |  |  |
| $P_2O_5$ |  |  |  |  |  |  |  |  |
| MgO | 3.7 | 3.2 | 3.9 | 4.4 | 3.3 | 5.4 | 3.6 | 3.6 |
| CaO | 0.2 | 0.2 | 0.2 | 0.2 | 0.2 | 0.2 | 0.2 | 0.2 |
| SrO |  |  |  |  |  |  |  |  |
| BaO |  |  |  |  |  |  |  |  |
| ZnO |  |  |  |  |  |  |  |  |
| $TiO_2$ | 0.1 | 0.1 | 0.1 | 0.1 | 0.1 | 0.1 | 0.1 | 0.1 |
| $ZrO_2$ | 1.3 | 1.3 | 0.8 | 1.1 | 1.3 | 1.3 | 1.3 | 1.0 |
| $Y_2O_3$ | 0.5 | 0.5 | 0.5 | 0.3 | 0.5 | 0.5 | 0.5 | 0.8 |
| $Li_2O$ | 10.5 | 11.6 | 10.0 | 10.1 | 10.5 | 10.0 | 11.2 | 10.5 |
| $Na_2O$ | 4.5 | 5.0 | 5.3 | 3.9 | 4.5 | 4.1 | 4.7 | 5.4 |
| $K_2O$ | 1.5 | 1.5 | 1.3 | 1.2 | 1.5 | 1.4 | 1.5 | 1.5 |
| Sum |  | 100.0 | 100.0 | 100.0 | 100.0 | 100.0 | 100.0 | 100.0 |
| Value M | 1281 | 1141 | 1098 | 1062 | 1282 | 1320 | 1507 | 1382 |
| Value I | 312 | 537 | 532 | 818 | 715 | 661 | 833 | 579 |
| Value I2 | 2.3 | 2.8 | 2.5 | 2.5 | 2.5 | 2.5 | 2.5 | 2.5 |
| Density (g/cm³) | 2.49 | 2.48 | 2.48 | 2.46 | 2.48 | 2.49 | 2.50 | 2.51 |
| E (GPa) | 88 | 85 | 85 | 85 | 86 | 86 | 87 | 87 |
| α50-350 ($10^{-7}$/° C.) | 75 | 80 | 77 | 70 | 75 | 73 | 78 | 80 |
| Tg (° C.) | 566 | 539 | 573 | 571 | 577 | 576 | 577 | 582 |
| T2 (° C.) | 1603 | 1569 | 1619 | 1638 | 1623 | 1601 | 1592 | 1595 |
| T4 (° C.) | 1156 | 1115 | 1164 | 1179 | 1170 | 1160 | 1152 | 1152 |
| Devitrification temperature (° C.) | 1150-1171 |  |  | 1171-1200 | 1220-1250 | 1170-1200 |  |  |
| DSC peak height mcal/s | 2.84 | 2.29 | 3.21 | 3.75 | 3.37 | 3.00 | 3.89 | 3.31 |

TABLE 6-continued

|  | Ex. 30 | Ex. 31 | Ex. 32 | Ex. 33 | Ex. 34 | Ex. 35 | Ex. 36 | Ex. 37 |
|---|---|---|---|---|---|---|---|---|
| Crystal growth rate | 570 | 455 | 600 | 822 | 676 | 613 | 782 | 616 |
| Devitrification during float simulation temperature dropping |  |  |  |  |  |  |  |  |
| Refractive index | 1.525 | 1.526 | 1.525 | 1.522 | 1.526 | 1.527 | 1.530 | 1.530 |
| Photoelastic constant | 28.2 | 27.9 | 27.9 | 28.5 | 28.1 | 28.0 | 27.5 | 27.4 |
| CS1 | 369 | 368 | 348 | 368 | 390 | 375 | 439 | 391 |
| DOL1 | 104 | 99 | 110 | 107 | 109 | 101 | 107 | 109 |
| CS2 | 923 | 803 | 945 | 920 | 956 | 1023 | 992 | 1015 |
| DOL2 | 10.1 | 10.4 | 10.2 | 9.4 | 10.3 | 8.5 | 9.7 | 10.0 |
| CS3 | 265 | 254 | 246 | 258 | 273 | 278 | 296 | 273 |
| DOL3 | 152 | 151 | 157 | 158 | 154 | 145 | 148 | 149 |

In each of the glasses in Examples 1 to 23, 30 to 32, and 37 having the value M of 1,000 or more, the value I of 600 or less and the value I2 of 5 or less, it is understood that the surface compressive stress CS1 obtained by the one-stage strengthening is large, the surface compressive stress CS2 obtained by the two-stage strengthening is large, and the crystal growth rate is low. This means that for the glass compositions of those glasses, defects of devitrification hardly occur and high yield can be expected in a mass-production process such as a float process, and high strength can be exhibited in practical use as a cover glass or the like.

In each of Examples 33 to 36 having the value M of 1,000 or more and the value I2 of 5 or less while having the value I being slightly large, the glass tends to be devitrified a little easily due to its devitrification temperature being higher than in Example 1, etc. However it is understood that the glass can obtain an excellent strength by the chemical strengthening.

In each of Examples 24, 26, and 27 having the values I and I2 being small while having the value M being smaller than 1,000, it is understood that the surface compressive stress caused by the chemical strengthening may be insufficient, but the crystal growth rate is low and the glass is not devitrified easily.

In Example 25 having the value M being small and the values I and I2 being large, the glass has a crystal growth rate too high to be manufactured easily.

Although the present invention has been described in detail with reference to its specific embodiments, it is obvious for those in the art that various changes or modifications can be made without departing from the spirit and scope of the present invention. The present application is based on a Japanese patent application (Japanese Patent Application No. 2018-018508) filed on Feb. 5, 2018, the contents of which are incorporated by reference.

REFERENCE SIGNS LIST 1 platinum cell for evaluating devitrification
2 concave portion
3 glass particle

The invention claimed is:

1. A glass for chemical strengthening comprising, in mole percentage on an oxide basis:
60 to 72% of $SiO_2$;
9 to 20% of $Al_2O_3$;
1 to 15% of $Li_2O$;
0.1 to 5% of $Y_2O_3$;
0 to 1.5% of $ZrO_2$; and
0 to 1% of $TiO_2$,
having a total content of one or more kinds of MgO, CaO, SrO, BaO and ZnO of 1 to 10%,
having a total content of $Na_2O$ and $K_2O$ of 1.5 to 10%,
having a total content of $B_2O_3$ and $P_2O_5$ of 0 to 10%,
wherein a ratio $([Al_2O_3]+[Li_2O])/([Na_2O]+[K_2O]+[MgO]+[CaO]+[SrO]+[BaO]+[ZnO]+[ZrO_2]+[Y_2O_3])$ is from 0.7 to 3,
wherein a ratio $[MgO]/([CaO]+[SrO]+[BaO]+[ZnO])$ is from 10 to 45, and
having a value M expressed by the following expression of 1,100 or more:

$$M=-5\times[SiO_2]+121\times[Al_2O_3]+50\times[Li_2O]-35\times[Na_2O]+32\times[K_2O]+85\times[MgO]+54\times[CaO]-41\times[SrO]-4\times[P_2O_5]+218\times[Y_2O_3]+436\times[ZrO_2]-1180,$$

wherein each of $[SiO_2]$, $[Al_2O_3]$, $[Li_2O]$, $[Na_2O]$, $[K_2O]$, $[MgO]$, $[CaO]$, $[SrO]$, $[P_2O_5]$, $[Y_2O_3]$, and $[ZrO_2]$ designates a content of each component in mole percentage on an oxide basis.

2. The glass for chemical strengthening according to claim 1, comprising, in mole percentage on an oxide basis: 1 to 10% of $Na_2O$.

3. The glass for chemical strengthening according to claim 1, comprising, in mole percentage on an oxide basis: 0.5 to 10% of $K_2O$.

4. The glass for chemical strengthening according to claim 1, comprising, in mole percentage on an oxide basis: 1 to 10% of MgO.

5. The glass for chemical strengthening according to claim 1, having the total content of $Na_2O$ and $K_2O$ of 1.5 to 8% in mole percentage on an oxide basis.

6. The glass for chemical strengthening according to claim 1, having the total content of $B_2O_3$ and $P_2O_5$ of 0 to 6% in mole percentage on an oxide basis.

7. The glass for chemical strengthening according to claim 1, having a temperature (T4) at which a viscosity is $10^4$ dPa·s of 1,350° C. or lower.

8. The glass for chemical strengthening according to claim 1, wherein when the glass is chemically strengthened by an immersion in a sodium nitrate at 450° C. for 1 hour, a surface compressive stress value thereof is 300 MPa or more, and
when the glass is chemically strengthened by an immersion in a sodium nitrate at 450° C. for 3 hour and a subsequent immersion in a potassium nitrate at 450° C.

for 1.5 hours, a surface compressive stress value thereof is 800 MPa or more.

\* \* \* \* \*